(12) United States Patent
Chang et al.

(10) Patent No.: US 12,411,307 B2
(45) Date of Patent: Sep. 9, 2025

(54) OPTICAL LENS ASSEMBLY, IMAGING APPARATUS AND ELECTRONIC DEVICE

(71) Applicant: LARGAN PRECISION CO., LTD., Taichung (TW)

(72) Inventors: Chien-Pang Chang, Taichung (TW); Wen-Yu Tsai, Taichung (TW); Chun-Hung Teng, Taichung (TW); Kuo-Chiang Chu, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 619 days.

(21) Appl. No.: 17/553,963

(22) Filed: Dec. 17, 2021

(65) Prior Publication Data

US 2022/0196970 A1    Jun. 23, 2022

Related U.S. Application Data

(60) Provisional application No. 63/129,826, filed on Dec. 23, 2020, provisional application No. 63/137,772, filed on Jan. 15, 2021.

(30) Foreign Application Priority Data

Sep. 14, 2021   (TW) ................. 110134271

(51) Int. Cl.
*G02B 1/11* (2015.01)
*G02B 1/04* (2006.01)
(Continued)

(52) U.S. Cl.
CPC ............. *G02B 9/60* (2013.01); *G02B 1/04* (2013.01); *G02B 1/11* (2013.01); *G02B 9/62* (2013.01); *G02B 9/64* (2013.01)

(58) Field of Classification Search
CPC ... G02B 9/60; G02B 1/04; G02B 1/11; G02B 9/62; G02B 9/64; G02B 3/08;
(Continued)

(56) References Cited

U.S. PATENT DOCUMENTS 5,665,422 A * 9/1997 Endo ..................... H01J 9/20
427/205
8,202,392 B2   6/2012 Jiang et al.
(Continued)

FOREIGN PATENT DOCUMENTS

CN    103185905 A    7/2013
CN    111201455 A    5/2020
(Continued)

OTHER PUBLICATIONS

Thibault et al "Enhanced optical design by distortion control" (Year: 2005).*
(Continued)

*Primary Examiner* — Bumsuk Won
*Assistant Examiner* — John Curtis Sipes
(74) *Attorney, Agent, or Firm* — McClure, Qualey & Rodack, LLP

(57) ABSTRACT

An optical lens assembly is provided in the present disclosure. The optical lens assembly includes, from an object side to an image side, at least five optical lens elements. At least one of the optical lens elements includes an anti-reflective coating, and the optical lens element including the anti-reflective coating is made of a plastic material. The anti-reflective coating is arranged on an object-side surface or an image-side surface of the optical lens element including the anti-reflective coating. The anti-reflective coating includes at least one coating layer, and the coating layer at the outer of the anti-reflective coating is made of metal oxide. The anti-reflective coating includes a plurality of holes, and sizes
(Continued)

of the holes adjacent to the outer of the anti-reflective coating are relatively larger than sizes of the holes adjacent to the inner of the anti-reflective coating.

19 Claims, 11 Drawing Sheets

(51) Int. Cl.
*G02B 9/60* (2006.01)
*G02B 9/62* (2006.01)
*G02B 9/64* (2006.01)

(58) Field of Classification Search
CPC .......................... G02B 1/118; G02B 13/0045; G02B 13/0015; G02B 1/115
See application file for complete search history.

(56) References Cited

U.S. PATENT DOCUMENTS

| | | |
|---|---|---|
| 9,733,397 B2 | 8/2017 | Shibuya et al. |
| 11,112,542 B2 | 9/2021 | Chu et al. |
| 2001/0004300 A1 | 6/2001 | Tanaka et al. |
| 2005/0233113 A1 | 10/2005 | Kotani et al. |
| 2006/0134433 A1 | 6/2006 | Vaula et al. |
| 2006/0199040 A1 | 9/2006 | Yamada et al. |
| 2008/0102259 A1 | 5/2008 | Nikolov et al. |
| 2009/0022954 A1 | 1/2009 | Kotani et al. |
| 2009/0081361 A1 | 3/2009 | Yamada et al. |
| 2009/0219620 A1 | 9/2009 | Yamada et al. |
| 2010/0119782 A1 | 5/2010 | Ohgane |
| 2010/0220377 A1 | 9/2010 | Yamada et al. |
| 2011/0019277 A1 | 1/2011 | Sager et al. |
| 2011/0176216 A1 | 7/2011 | Kawauchi et al. |
| 2012/0075688 A1 | 3/2012 | Yamada et al. |
| 2012/0081792 A1 | 4/2012 | Neuffer |
| 2012/0176681 A1 | 7/2012 | Chang et al. |
| 2012/0212827 A1 | 8/2012 | Kakegawa |
| 2012/0275027 A1 | 11/2012 | Okuno |
| 2013/0016430 A1 | 1/2013 | Ogawa et al. |
| 2013/0027779 A1 | 1/2013 | Okuno et al. |
| 2013/0140675 A1 | 6/2013 | Chen et al. |
| 2013/0201562 A1 | 8/2013 | Kawagishi et al. |
| 2013/0228942 A1 | 9/2013 | Ohgane |
| 2013/0258480 A1 | 10/2013 | Makino et al. |
| 2013/0260096 A1 | 10/2013 | Shiki et al. |
| 2013/0271842 A1 | 10/2013 | Miyahara et al. |
| 2013/0273317 A1 | 10/2013 | Nakayama |
| 2013/0329295 A1 | 12/2013 | Okuno |
| 2014/0016189 A1 | 1/2014 | Tamura et al. |
| 2014/0063610 A1 | 3/2014 | Murata et al. |
| 2014/0117397 A1 | 5/2014 | Saeki et al. |
| 2014/0254019 A1 | 9/2014 | Murata et al. |
| 2014/0320968 A1 | 10/2014 | Murata et al. |
| 2014/0320970 A1 | 10/2014 | Kamiyam et al. |
| 2014/0329072 A1 | 11/2014 | Hirasawa et al. |
| 2015/0103226 A1 | 4/2015 | Takahashi |
| 2015/0153484 A1 | 6/2015 | Neuffer |
| 2015/0160377 A1 | 6/2015 | Kuroda et al. |
| 2015/0369967 A1 | 12/2015 | Okuno et al. |
| 2016/0054476 A1 | 2/2016 | Choi et al. |
| 2016/0216409 A1 | 7/2016 | Schulz et al. |
| 2016/0313537 A1* | 10/2016 | Mercado ............ G02B 13/0045 |
| 2016/0377767 A1 | 12/2016 | Sonoda et al. |
| 2017/0160437 A1 | 6/2017 | Nakayama |
| 2017/0212278 A1 | 7/2017 | Abe |
| 2017/0276839 A1 | 9/2017 | Teramoto |
| 2018/0100957 A1 | 4/2018 | Ye et al. |
| 2018/0194619 A1 | 7/2018 | Greer et al. |
| 2018/0203162 A1 | 7/2018 | Schulz et al. |
| 2018/0259681 A1* | 9/2018 | Makino ................ C08L 1/14 |
| 2019/0016593 A1 | 1/2019 | Greer et al. |
| 2019/0196064 A1 | 6/2019 | Nakamura et al. |
| 2019/0278046 A1* | 9/2019 | Yamamoto ............... G02B 7/02 |
| 2020/0240011 A1 | 7/2020 | Kauppinen et al. |
| 2021/0006733 A1* | 1/2021 | Lee .......................... H04N 5/33 |
| 2021/0159373 A1* | 5/2021 | Grundmann ............ H01L 33/24 |

FOREIGN PATENT DOCUMENTS

| | | |
|---|---|---|
| EP | 2906971 A1 | 8/2015 |
| JP | 2001017907 A | 1/2001 |
| JP | 2013218035 A | 10/2013 |
| KR | 101546813 B1 | 8/2015 |
| TW | M591177 U | 2/2020 |
| TW | 202022472 A | 6/2020 |
| WO | 2010024214 A1 | 3/2010 |

OTHER PUBLICATIONS

Christoffer Kauppinen et al., "Grass-like Alumina with Low Refractive Index for Scalable, Broadband, Omnidirectional Antireflection Coatings on Glass Using Atomic Layer Deposition", ACS Applied Materials & Interfaces, published on Apr. 11, 2017, vol. 9, Issue 17, pp. 15038-15043, published by American Chemical Society, U.S.A.

Kirill Isakov et al., "Superhydrophobic Antireflection Coating on Glass Using Grass-like Alumina and Fluoropolymer", ACS Applied Materials & Interfaces, published on Oct. 21, 2020, vol. 12, Issue 44, pp. 49957-49962, published by American Chemical Society, U.S.A.

Takeharu Okuno et al., "The Development of Subwavelength Structure Coating (SWC)", Journal of The Society of Photographic Science and Technology of Japan, published in 2011, vol. 74, Issue 6, pp. 302-307, published by The Society of Photographic Science and Technology of Japan, Japan.

* cited by examiner

OPTICAL LENS ASSEMBLY, IMAGING APPARATUS AND ELECTRONIC DEVICE

RELATED APPLICATIONS

This application claims priorities to U.S. Provisional application Ser. No. 63/129,826, filed Dec. 23, 2020, U.S. Provisional application Ser. No. 63/137,772, filed Jan. 15, 2021, and Taiwan Application Serial Number 110134271, filed Sep. 14, 2021, which are herein incorporated by references.

BACKGROUND

Technical Field

The present disclosure relates to an optical lens assembly and an imaging apparatus. More particularly, the present disclosure relates to an optical lens assembly and an imaging apparatus for preventing reflection.

Description of Related Art

The effect of reducing reflections in a wide field of wavelength by the coating layers, which are manufactured by conventional anti-reflective coating techniques, is insufficient. The image quality becomes lower because of the strong light in the long-wavelength range. Hence, it is unable to meet the significantly increasing requirement of lens assemblies with high quality for the high-end mobile devices. Furthermore, the number of lens elements in the optical lens assemblies significantly increases correspondingly. Due to the growing difficulty in designing optical systems and the increment of lens elements, it is a trend to develop a coating technique for excellent anti-reflective effect in the wide field of wavelength in the high-end optical systems with multiple lens elements and on the optical lens elements with extreme changes.

SUMMARY

According to one aspect of the present disclosure, an optical lens assembly includes, from an object side to an image side, at least five optical lens elements. At least one of the optical lens elements includes an anti-reflective coating, and the optical lens element including the anti-reflective coating is made of a plastic material. The anti-reflective coating is arranged on an object-side surface or an image-side surface of the optical lens element including the anti-reflective coating. The anti-reflective coating includes at least one coating layer, and the coating layer at the outer of the anti-reflective coating is made of metal oxide. The anti-reflective coating includes a plurality of holes, and sizes of the plurality of holes adjacent to the outer of the anti-reflective coating are relatively larger than sizes of the plurality of holes adjacent to the inner of the anti-reflective coating. When a refractive index of the optical lens element including the anti-reflective coating is Ns, the coating layer at the innermost of the anti-reflective coating is a first coating layer, a refractive index of the first coating layer is N1, a thickness of the first coating layer is TL1, and a super-wide field of wavelength factor of the optical lens assembly as arranging the anti-reflective coating is Farw, the following conditions are satisfied: N1<Ns; 50 nm≤TL1≤200 nm; and Farw≤0.60.

According to another aspect of the present disclosure, an imaging apparatus includes the optical lens assembly of the foregoing aspect and an image sensor. The image sensor is disposed on an image surface of the optical lens assembly.

According to one another aspect of the present disclosure, an electronic device, which is a mobile device, includes the imaging apparatus of the foregoing aspect.

According to still another aspect of the present disclosure, an imaging apparatus includes the optical lens assembly of the foregoing aspect, a Fresnel lens element and an image sensor. At least one surface of the Fresnel lens element includes an anti-reflective coating, and the anti-reflective coating of the Fresnel lens element is made of aluminum oxide. The image sensor is disposed on an image surface of the optical lens assembly.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
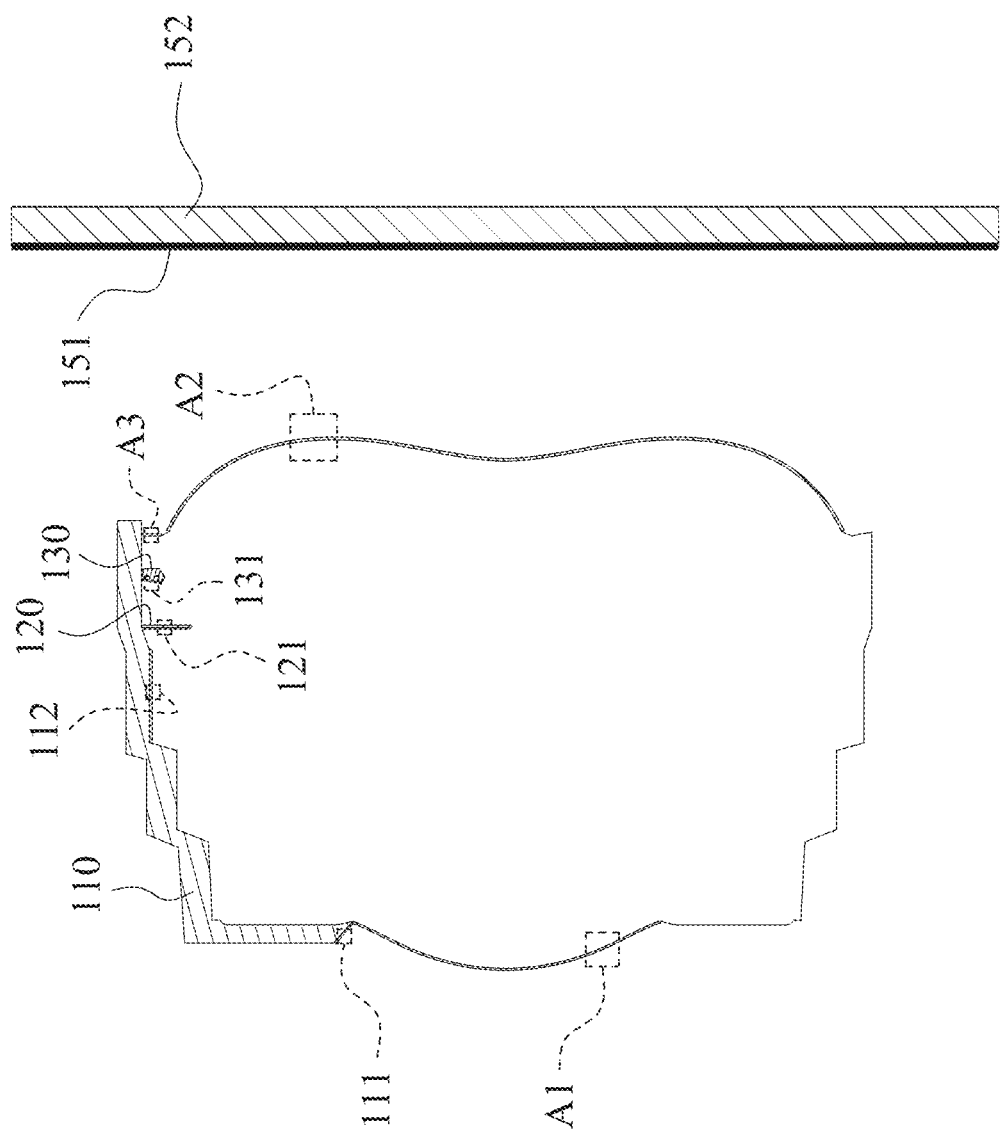
FIG. 1 is a schematic view of an imaging apparatus according to the 1st embodiment of the present disclosure.

According to one aspect of the present disclosure, an optical lens assembly includes, from an object side to an image side, at least five optical lens elements. At least one of the optical lens elements includes an anti-reflective coating, and the optical lens element including the anti-reflective coating is made of a plastic material. The anti-reflective coating is arranged on an object-side surface or an image-side surface of the optical lens element including the anti-reflective coating. The anti-reflective coating includes at least one coating layer, and the coating layer at the outer of the anti-reflective coating is made of metal oxide. The anti-reflective coating includes a plurality of holes, and sizes of the plurality of holes adjacent to the outer of the anti-reflective coating are relatively larger than sizes of the plurality of holes adjacent to the inner of the anti-reflective coating.

When a refractive index of the optical lens element including the anti-reflective coating is Ns, the coating layer at the innermost of the anti-reflective coating is a first coating layer, and a refractive index of the first coating layer is N1, the following condition is satisfied: N1<Ns.

When a thickness of the first coating layer is TL1, the following condition is satisfied: 50 nm≤TL1≤200 nm. Moreover, the following condition can be satisfied: 80 nm≤TL1≤150 nm.

When the refractive index of the optical lens element including the anti-reflective coating is Ns, the refractive index of the first coating layer is N1, a super-wide field of wavelength factor of the optical lens assembly as arranging the anti-reflective coating is Farw, wherein Farw represents a deviation factor between the refractive index of the optical lens element including the anti-reflective coating and the refractive index of the first coating layer, and Farw=((N1−Ns)/(N1+Ns))$^2$, the following condition is satisfied: Farw≤0.60. Moreover, the following conditions can be satisfied: Farw≤0.50; Farw≤0.45; Farw≤0.40; Farw≤0.30; or 0≤Farw≤0.10.

The optical lens assembly with multiple optical lens elements is provided in the present disclosure. The multiple coating-layer design is adopted to obtain an excellent coating arranging formula in a wide field of wavelength with specific multiple anti-reflective coating factors. Furthermore, due to the characteristic of subwavelength structures on the surface of the anti-reflective coating, the best anti-reflective effect in the wide field of wavelength of the high-quality optical lens assembly with multiple optical lens elements can be obtained. The severe reflective problem, which is difficult to be solved, of strong light at large angle on the optical lens elements with extreme surface shape changes can also be overcome. It is especially suitable for the curved optical lens element and the material with relatively high refractive index, so as to obtain a uniform anti-reflective effect within all fields and the wide field of wavelength. In this regard, when the assembly is applied to the optical lens assembly with multiple optical lens elements, it is favorable for significantly enhancing the imaging quality of the high-end optical lens assembly.

When a central thickness of the optical lens element including the anti-reflective coating is CT, a maximum of displacements in parallel with an optical axis from an axial vertex of the optical lens element including the anti-reflective coating to a surface of the optical lens element including the anti-reflective coating is SAGmax, a first anti-reflective coating arranging factor of the optical lens assembly is Far1, wherein Far1 represents a correlation factor of change between the thickness and the horizontal displacements in an off-axis region of the optical lens element including the anti-reflective coating, and Far1=|SAGmax|/CT, the following condition can be satisfied: 0.500≤Far1. Through controlling the correlation factor of change between the thickness and the horizontal displacements in the off-axis region of the optical lens element including the anti-reflective coating in the optical lens assembly, the best coating arrangement in the wide field of wavelength of the optical lens assembly can be effectively obtained. Moreover, the following conditions can be satisfied: 1.000≤Far1; 1.500≤Far1≤5; 1.700≤Far1≤10; or 2.000≤Far1≤100.

When an average of tangent slopes in an optical effective diameter region of a surface of the optical lens element including the anti-reflective coating is SPavg, a minimum of the tangent slopes in the optical effective diameter region of the surface of the optical lens element including the anti-reflective coating is SPmin, a second anti-reflective coating arranging factor of the optical lens assembly is Far2, wherein Far2 represents a surface-changing factor in the off-axis region of the optical lens element including the anti-reflective coating, and Far2=1/(|SPavg|×|SPmin|), the following condition can be satisfied: 0.100≤Far2. Through controlling the surface-changing factor in the off-axis region of the optical lens element including the anti-reflective coating in the optical lens assembly, the best coating arrangement in the wide field of wavelength of the optical lens assembly and the value of applications of the high-end coating can be effectively obtained. Moreover, the following conditions can be satisfied: 0.200≤Far2≤0.7; 0.300≤Far2≤0.8; 0.400≤Far2≤0.9; or 0.500≤Far2≤1.

When the first anti-reflective coating arranging factor of the optical lens assembly is Far1 the second anti-reflective coating arranging factor of the optical lens assembly is Far2, the super-wide field of wavelength factor of the optical lens assembly as arranging the anti-reflective coating is Farw, a major anti-reflective coating arranging factor of the optical lens assembly is FAR, and FAR=LOG(Far1×Far2×Farw), the following condition can be satisfied: 7.000≤FAR. Through arranging the anti-reflective coating on the most suitable surface of the optical lens elements in the optical lens assembly, and adjusting the combination of the material of the optical lens element including the anti-reflective coating and the material of the first coating layer, light can pass the coating layer of the anti-reflective coating from the air into the optical lens element in a way of gradually changing the refractive index thereof. It is favorable for performing the best anti-reflective effect in the wide field of wavelength. Moreover, the following conditions can be satisfied: −5.000≤FAR; −4.000≤FAR; −2.500≤FAR; −2.000≤FAR<0; or −2.000≤FAR−1.000.

When the refractive index of the optical lens element including the anti-reflective coating is Ns, the following condition can be satisfied: 1.530≤Ns 1.690. Through combining the optical lens element including the anti-reflective coating with appropriate refractive index and the coating layer of the anti-reflective coating with low refractive index in a middle portion thereof, the anti-reflective effect of the coating layer can be effectively improved. Thus, it is favorable for enhancing the reduction of reflectance. Moreover, the following conditions can be satisfied: 1.400≤Ns≤1.768; or 1.500≤Ns≤1.700.

When the refractive index of the first coating layer is N1, the following condition can be satisfied: 1.37≤N1≤1.63. Through using the material with low refractive index, the effect of gradient refractive index can be effectively improved.

The material of the first coating layer can be SiO$_2$. Through manufacturing the coating layer, which is in contact with the optical lens element including the anti-reflective coating, with the material of low refractive index, the best effect of gradient refractive index can be obtained.

The anti-reflective coating can include at least two coating layers made of different main materials. Through manufacturing the coating layer in the middle portion of the anti-reflective coating with the material of low refractive index, the gradient change of refractive index can be effectively obtained, and the reduction of reflectance in the wide field of wavelength can effectively perform.

When a wavelength at a trough with lowest reflectance of the optical lens element including the anti-reflective coating is Wtmin, the following condition can be satisfied: 400 nm Wtmin 750 nm. Through controlling the trough with lowest reflectance in a specific wavelength range, it is favorable for maintaining a consistent low reflective effect from a short wavelength region to a long wavelength region. Moreover, the following conditions can be satisfied: 450 nm Wtmin 740 nm, 500 nm Wtmin 730 nm, 550 nm Wtmin 720 nm, or 600 nm Wtmin 710 nm.

When a reflectance at the trough with lowest reflectance of the optical lens element including the anti-reflective coating is Rtmin, the following condition can be satisfied: 0.01% Rtmin 0.50%. Through reducing the reflectance at the trough of the optical lens element including the anti-reflective coating, it is favorable for improving the anti-reflective effect of the coating layer of the anti-reflective coating at a specific wavelength.

When an average reflectance between a wavelength of 400 nm–1000 nm of the optical lens element including the anti-reflective coating is R40100, the following condition can be satisfied: $0.05\% \leq R40100 \leq 1.5\%$. Thus, the overall low reflectance in a super-wide field of wavelength can be effectively controlled.

When a reflectance at a wavelength of 700 nm of the optical lens element including the anti-reflective coating is R70, the following condition can be satisfied: $0.01\% \leq R70 \leq 1.0\%$. Thus, the low reflectance at a specific wavelength can be effectively controlled.

At least one surface of the optical lens element including the anti-reflective coating can include at least one inflection point. By the design of the inflection point at the surface of the optical lens element including the anti-reflective coating according to the present disclosure, it is favorable for obtaining the cost efficiency of coating by the atomic layer deposition method. A uniform coating can be manufactured on the surface, which has extreme surface shape changes, of the optical lens element including the anti-reflective coating. A defect of strong reflective light at a peripheral region of the optical lens element including the anti-reflective coating due to the reflectance offset, which is caused by the difference between the coating layer thicknesses of the anti-reflective coating, can be avoided.

When a total number of coating layer of the anti-reflective coating is tLs, the following condition can be satisfied: $1 \leq tLs \leq 2$. Through controlling the number of the coating layer, the manufacturing efficiency can be effectively enhanced and the cost can be reduced.

When the coating layer connecting to the first coating layer is a second coating layer, and a thickness of the second coating layer is TL2, the following condition can be satisfied: 100 nm≤TL2≤250 nm. Through controlling the thickness of the second coating layer, it is favorable for obtaining the best anti-reflective effect.

When a total thickness of coating layer of the anti-reflective coating is tTk, the following condition can be satisfied: 100 nm≤tTk≤300 nm. Through controlling the total thickness of coating layer of the anti-reflective coating, the overall low reflective effect in the wide field of wavelength can be effectively maintained. Moreover, the following condition can be satisfied: 200 nm≤tTk≤250 nm.

According to one embodiment of another aspect of the present disclosure, an imaging apparatus includes the optical lens assembly of the aforementioned aspect and an image sensor. The image sensor is disposed on an image surface of the optical lens assembly.

According to another embodiment of another aspect of the present disclosure, an imaging apparatus includes the optical lens assembly of the aforementioned aspect, a Fresnel lens element and an image sensor. At least one surface of the Fresnel lens element includes an anti-reflective coating, and the anti-reflective coating of the Fresnel lens element is made of aluminum oxide. The image sensor is disposed on an image surface of the optical lens assembly. According to the present disclosure, the anti-reflective coating of wide field of wavelength is designed to be manufactured on the Fresnel lens element, so as to solve the high reflective problem at the inflection of surface shape on the Fresnel lens element.

According to one another aspect of the present disclosure, an electronic device, which is a mobile device, includes the imaging apparatus of the aforementioned aspect.

When a field of view of the optical lens assembly is FOV, the following conditions can be satisfied: 60 degrees FOV≤220 degrees; or 70 degrees≤FOV≤100 degrees.

When an average reflectance between a wavelength of 400 nm–700 nm of the optical lens element including the anti-reflective coating is R4070, the following condition can be satisfied: $0.05\% \leq R4070 \leq 1.5\%$. Thus, the low reflectance in the visible light range of super-wide field of wavelength can be effectively controlled.

When an average reflectance between a wavelength of 400 nm–600 nm of the optical lens element including the anti-reflective coating is R4060, the following condition can be satisfied: $0.05\% \leq R4060 \leq 1.5\%$. Thus, the low reflectance in the blue light and green light range of wide field of wavelength can be effectively controlled.

When an average reflectance between a wavelength of 500 nm–600 nm of the optical lens element including the anti-reflective coating is R5060, the following condition can be satisfied: $0.01\% \leq R5060 \leq 1.0\%$. Thus, the low reflectance in the green light range of wide field of wavelength can be effectively controlled.

When an average reflectance between a wavelength of 600 nm–700 nm of the optical lens element including the anti-reflective coating is R6070, the following condition can be satisfied: $0.01\% \leq R6070 \leq 1.0\%$. Thus, the low reflectance in the red light range of wide field of wavelength can be effectively controlled.

When an average reflectance between a wavelength of 600 nm–800 nm of the optical lens element including the anti-reflective coating is R6080, the following condition can be satisfied: $0.01\% \leq R6080 \leq 1.0\%$. Thus, the low reflectance in the red light range of wide field of wavelength can be effectively controlled.

When an average reflectance between a wavelength of 700 nm–1000 nm of the optical lens element including the anti-reflective coating is R70100, the following condition can be satisfied: $0.05\% \leq R70100 \leq 2.0\%$. Thus, the low reflectance in the long-wavelength range of wide field of wavelength can be effectively controlled.

When an average reflectance between a wavelength of 800 nm–1000 nm of the optical lens element including the anti-reflective coating is R80100, the following condition can be satisfied: $0.05\% \leq R80100 \leq 2.5\%$. Thus, the low reflectance in the long-wavelength range of wide field of wavelength can be effectively controlled.

When an average reflectance between a wavelength of 900 nm–1000 nm of the optical lens element including the anti-reflective coating is R90100, the following condition can be satisfied: $0.10\% \leq R90100 \leq 5.0\%$. Thus, the low reflectance in the long-wavelength range of wide field of wavelength can be effectively controlled.

When a reflectance at a wavelength of 400 nm of the optical lens element including the anti-reflective coating is R40, the following condition can be satisfied:

$0.10\% \leq R40 \leq 35\%$. Thus, the low reflectance in the blue visible light range of wide field of wavelength can be effectively controlled.

When a reflectance at a wavelength of 500 nm of the optical lens element including the anti-reflective coating is R50, the following condition can be satisfied: $0.01\% \leq R50 \leq 1.0\%$. Thus, the low reflectance in the green visible light range of wide field of wavelength can be effectively controlled.

When a reflectance at a wavelength of 600 nm of the optical lens element including the anti-reflective coating is R60, the following condition can be satisfied: $0.01\% \leq R60 \leq 1.0\%$. Thus, the low reflectance in the red visible light range of wide field of wavelength can be effectively controlled.

When the reflectance at the wavelength of 700 nm of the optical lens element including the anti-reflective coating is R70, the following condition can be satisfied: $0.01\% \leq R70 \leq 1.0\%$. Thus, the low reflectance in the long-wavelength range of wide field of wavelength can be effectively controlled.

When a reflectance at a wavelength of 800 nm of the optical lens element including the anti-reflective coating is R80, the following condition can be satisfied: $0.01\% \leq R80 \leq 1.0\%$. Thus, the low reflectance in the long-wavelength range of wide field of wavelength can be effectively controlled.

When a reflectance at a wavelength of 900 nm of the optical lens element including the anti-reflective coating is R90, the following condition can be satisfied: $0.10\% \leq R90 \leq 1.5\%$. Thus, the low reflectance in the long-wavelength range of wide field of wavelength can be effectively controlled.

When a reflectance at a wavelength of 1000 nm of the optical lens element including the anti-reflective coating is R100, the following condition can be satisfied: $0.10\% \leq R100 \leq 10\%$. Thus, the low reflectance in the long-wavelength range of wide field of wavelength can be effectively controlled.

A refractive index of the second coating layer is N2, a refractive index of a material with high refractive index of the anti-reflective coating is NH, and a refractive index of a material with low refractive index of the anti-reflective coating is NL.

The construction of the optical lens assembly with excellent quality in the present disclosure must be designed optimally by the comprehensive evaluation of the parameters of the anti-reflective coating factors, such as the super-wide field of wavelength factor, the first anti-reflective coating arranging factor, the second anti-reflective coating arranging factor and the major anti-reflective coating arranging factor. The anti-reflective coating is disposed on the specific surface of the plastic optical lens element, so as to obtain the best anti-reflective effect and great imaging quality of the anti-reflective coating.

The anti-reflective coating designs can be modified properly and then applied to the optical lens elements of optical lens assemblies of other embodiments. The number of coating layers of the anti-reflective coating, the materials of the optical lens elements, and the coating materials with high refractive index material or low refractive index of the anti-reflective coating can be changed to meet the requirements. The anti-reflective coating can be applied to different optical lens assemblies and to the most suitable optical lens element after evaluating the various arranging factors optimally.

The optical lens assembly according to the present disclosure includes at least one trough at a wavelength of 400 nm-1000 nm. The trough is defined sequentially from short wavelength to long wavelength.

The troughs are sequentially defined based on the central region and increasingly from short wavelength to long wavelength, as T1, T2, T3, etc.

It is the most preferable that the optical lens element includes the anti-reflective coatings on the both surfaces thereof, but the anti-reflective coating can also be manufactured only on one suitable surface thereof. By adopting the technique of the present disclosure to the most suitable surfaces of the optical lens elements, the anti-reflective coatings manufactured by the atomic layer deposition method will have optimal values. The balance between the cost and the quality can be achieved. Also, by manufacturing the anti-reflective coatings on the material of optical lens elements having the most suitable refractive index, the best anti-reflective effect can be obtained.

The reflectance in the present disclosure is measured from a single surface of one optical lens element, and the data at the incident angle of 0 degrees is chosen to be the basis for the comparison of reflectance.

The pore distribution on the surface of the optical lens element can be effectively improved by the surface pore-forming process. Therefore, the distance between the pores on the surface of the optical lens element can increase, the pore structure can be sponge-like or the density of pores can be changed. The pore-forming effect can also change along the depth of the anti-reflective coating. For example, the outer side of the anti-reflective coating in contact with the air has larger pore structure, while the deeper inner side thereof has relatively smaller pore structure. The aforementioned pores are made of the spaces between the irregular nanofiber structures, and the air can stay or communicate between the pores. The outer side and inner side of the anti-reflective coating are that, in the sectional views and schematic views, the outer side is the side of the anti-reflective coating exposed to the air, and the inner side is the side of the anti-reflective coating closer to the optical lens element or the substrate. The pores/notches at the outer side are relatively larger than those at the inner side, which also means that the irregular branch-like structure distributes with a lower density at the outer side of a plane, and the irregular branch-like structure distributes with a higher density at the inner side of the same plane. The surface pore-forming process can be achieved by plasma etching, chemical etching, time-controlling crystalline size technique, or high-temperature solution treatment, such as immersion in alcohol or water over 50 degrees.

The refractive index of the material with high refractive index of the anti-reflective coatings in the present disclosure can be greater than 2.0, and the refractive index of the material with low refractive index of the anti-reflective coatings can be smaller than 1.8. For example, the materials of the anti-reflective coatings (refractive index at the wavelength of 587.6 nm) can be: magnesium fluoride ($MgF_2$, 1.3777), silicon dioxide ($SiO_2$, 1.4585), thorium tetrafluoride ($ThF_4$, 1.5125), silicon monoxide (SiO, 1.55), cerium trifluoride ($CeF_3$, 1.63), aluminum oxide ($Al_2O_3$, 1.7682), yttrium oxide ($Y_2O_3$, 1.79), hafnium dioxide ($HfO_2$, 1.8935), zinc oxide (ZnO, 1.9269), scandium oxide ($Sc_2O_3$, 1.9872), aluminum nitride (AlN, 2.0294), silicon nitride ($Si_3N_4$, 2.0381), tantalum pentoxide ($Ta_2O_5$, 2.1306), zirconium dioxide ($ZrO_2$, 2.1588), zinc sulfide (ZnS, 2.2719), niobium pentoxide ($Nb_2O_5$, 2.3403), titanium dioxide ($TiO_2$, 2.6142) or titanium nitride (TiN, 3.1307). The materials of the anti-reflective coatings can also be the mixture of magnesium fluoride-silicon dioxide ($MgF_2$—$SiO_2$), and the ratio of each composition thereof is $[SiO_2]>[MgF_2]$.

The material (N1) of the first coating layer closest to the material surface of the plastic optical lens element can be the material with low refractive index, such as magnesium fluoride ($MgF_2$, 1.3777), silicon dioxide ($SiO_2$, 1.4585), thorium tetrafluoride ($ThF_4$, 1.5125), silicon monoxide (SiO, 1.55) or cerium trifluoride ($CeF_3$, 1.63). The material of the first coating layer can also be the mixture of magnesium fluoride-silicon dioxide ($MgF_2$—$SiO_2$), and the ratio of each composition thereof is $[SiO_2]>[MgF_2]$. The material (N2) of the second coating layer can be aluminum nitride (AlN), aluminum oxide ($Al_2O_3$), aluminum hydroxide (Al$(OH)_3$) or mixtures with aluminum.

The anti-reflective coating of the present disclosure can be made by coating a single coating layer or a plurality of coating layers on the surface of the plastic optical lens element. Physical vapor deposition (PVD) can be adopted, such as evaporative deposition or sputtering deposition, or chemical vapor deposition (CVD) can be adopted, such as ultra-high vacuum chemical vapor deposition, microwave plasma-enhanced chemical vapor deposition, plasma-enhanced chemical vapor deposition or atomic layer deposition (ALD).

The all fields of the present disclosure are from the central field of view (0 Field) to the field of view of maximum image height (1.0 Field). The all fields cover the optical effective region on the surface of the optical lens element.

The tangent slopes of the surfaces of the optical lens elements are calculated as the optical axis being horizontal, and the tangent slopes in a paraxial region thereof are infinity (INF, $\infty$).

The optical lens assembly can further include a Fresnel lens element, and the Fresnel lens element includes an anti-reflective coating of aluminum oxide material on the surface thereof.

Thickness and high temperature will make the error of the surface shape change of the plastic optical lens elements become too large. When the number of coating layers of the anti-reflective coating increases, the effect of temperature on the surface shape accuracy is more obvious. The lens correcting technology can effectively solve the temperature effect problem as coating the plastic surface of the optical lens elements, which is favorable for maintaining the integrity of the coating on the optical lens elements and the high precision of the plastic optical lens elements, so as to obtain the optical lens assembly with high quality.

The lens correcting technology uses methods such as moldflow analysis method, curve fitting function method or wavefront aberration method, which is not limited thereto. The moldflow analysis method uses moldflow analysis to find out the three-dimensional contour nodes of the surface of the optical lens element which contracts on the Z axis. The three-dimensional contour nodes are converted into an aspherical curve to be compared with the original curve. At the same time, the correction value is calculated by considering the shrinkage rate of the material of the optical lens element and the deformation trend of surface shape. The curve fitting function method is to measure the contour deviation of the surface of the optical lens element, and the fitting curve approaches to the measuring point to obtain the correction value by curve-fitting with a function and then by an optimization algorithm. The function can be exponential or polynomial, and the optimization algorithm can be Gauss Newton algorithm, simplex algorithm or steepest descent method. The wavefront aberration method is to measure the wavefront aberration (imaging aberration) data of the optical lens assembly with an interferometer. The wavefront aberration generated during manufacturing and assembling is comprehensively analyzed with the wavefront aberration of the original design value, and the correction value is obtained after optimized with optical software.

According to the above description of the present disclosure, the following specific embodiments are provided for further explanation.

1st Embodiment

Please refer to FIG. 1. FIG. 1 is a schematic view of an imaging apparatus according to the 1st embodiment of the present disclosure. In FIG. 1, the imaging apparatus of the 1st embodiment includes an optical lens assembly (its reference number is omitted) and an image sensor 152. The optical lens assembly includes, from an object side to an image side, five optical lens elements (not shown) and an image surface 151. The image sensor 152 is disposed on the image surface 151 of the optical lens assembly. When a field of view of the optical lens assembly of the 1st embodiment is FOV, the following condition is satisfied: FOV=74.74 degrees.

The aforementioned five optical lens elements are, from the object side to the image side, an optical lens element 1, an optical lens element 2, an optical lens element 3, an optical lens element 4 and an optica lens element 5. At least one of the five optical lens elements includes an anti-reflective coating. The optical lens element including the anti-reflective coating is made of a plastic material. The anti-reflective coating is arranged on an object-side surface or an image-side surface of the optical lens element including the anti-reflective coating. The anti-reflective coating includes at least one coating layer, the coating layer at the outer of the anti-reflective coating is made of metal oxide. The anti-reflective coating includes a plurality of holes, and sizes of the plurality of holes adjacent to the outer of the anti-reflective coating are relatively larger than sizes of the plurality of holes adjacent to the inner of the anti-reflective coating.

When a super-wide field of wavelength factor of the optical lens element L1 as arranging the anti-reflective coating is Farw, the following condition is satisfied: Farw=0.071. When a first anti-reflective coating arranging factor of the object-side surface R1 of the optical lens element L1 is Far1, a second anti-reflective coating arranging factor of the object-side surface R1 of the optical lens element L1 is Far2, and a major anti-reflective coating arranging factor of the object-side surface R1 of the optical lens element L1 is FAR, the following conditions are satisfied: Far1=0.535; Far2=0.295; and FAR=−1.950. When a first anti-reflective coating arranging factor of the image-side surface R2 of the optical lens element L1 is Far1, a second anti-reflective coating arranging factor of the image-side surface R2 of the optical lens element L1 is Far2, and a major anti-reflective coating arranging factor of the image-side surface R2 of the optical lens element L1 is FAR, the following conditions are satisfied: Far1=0.010; Far2=0.012; and FAR=−5.050.

When a central thickness of the optical lens element L1 is CT, the following condition is satisfied: CT=0.63. The coating layer at the innermost of the anti-reflective coating is a first coating layer, and a refractive index of the first coating layer is N1. When a refractive index of the optical lens element L1 is Ns, the following condition is satisfied: Ns=1.54.

When a maximum of displacements in parallel with an optical axis from an axial vertex of the optical lens element L1 to the object-side surface R1 of the optical lens element L1 is SAGmax, the following condition is satisfied: |SAGmax|=0.34. When an average of tangent slopes in an optical effective diameter region of the object-side surface R1 of the optical lens element L1 is SPavg, the following condition is satisfied: |SPavg|=2.67. When a minimum of the tangent slopes in the optical effective diameter region of the object-side surface R1 of the optical lens element L1 is SPmin, the following condition is satisfied: |SPmin|=1.27.

When a maximum of displacements in parallel with an optical axis from an axial vertex of the optical lens element L1 to the image-side surface R2 of the optical lens element L1 is SAGmax, the following condition is satisfied: |SAGmax|=0.01. When an average of tangent slopes in an optical effective diameter region of the image-side surface R2 of the optical lens element L1 is SPavg, the following condition is satisfied: |SPavg|=29.41. When a minimum of the tangent slopes in the optical effective diameter region of the image-side surface R2 of the optical lens element L1 is SPmin, the following condition is satisfied: |SPmin|=2.79.

When a super-wide field of wavelength factor of the optical lens element L2 as arranging the anti-reflective coating is Farw, the following condition is satisfied: Farw=0.334. When a first anti-reflective coating arranging factor of the object-side surface R1 of the optical lens element L2 is Far1, a second anti-reflective coating arranging factor of the object-side surface R1 of the optical lens element L2 is Far2, and a major anti-reflective coating arranging factor of the object-side surface R1 of the optical lens element L2 is FAR, the following conditions are satisfied: Far1=0.058; Far2=0.003; and FAR=−4.271. When a first anti-reflective coating arranging factor of the image-side surface R2 of the optical lens element L2 is Far1, a second anti-reflective coating arranging factor of the image-side surface R2 of the optical lens element L2 is Far2, and a major anti-reflective coating arranging factor of the image-side surface R2 of the optical lens element L2 is FAR, the following conditions are satisfied: Far1=0.730; Far2=0.156; and FAR=−1.421.

When a central thickness of the optical lens element L2 is CT, the following condition is satisfied: CT=0.25. The coating layer at the innermost of the anti-reflective coating is a first coating layer, and a refractive index of the first coating layer is N1. When a refractive index of the optical lens element L2 is Ns, the following condition is satisfied: Ns=1.64.

When a maximum of displacements in parallel with an optical axis from an axial vertex of the optical lens element L2 to the object-side surface R1 of the optical lens element L2 is SAGmax, the following condition is satisfied: |SAGmax|=0.01. When an average of tangent slopes in an optical effective diameter region of the object-side surface R1 of the optical lens element L2 is SPavg, the following condition is satisfied: |SPavg|=43.48. When a minimum of the tangent slopes in the optical effective diameter region of the object-side surface R1 of the optical lens element L2 is SPmin, the following condition is satisfied: |SPmin|=8.33.

When a maximum of displacements in parallel with an optical axis from an axial vertex of the optical lens element L2 to the image-side surface R2 of the optical lens element L2 is SAGmax, the following condition is satisfied: |SAGmax|=0.18. When an average of tangent slopes in an optical effective diameter region of the image-side surface R2 of the optical lens element L2 is SPavg, the following condition is satisfied: |SPavg|=4.61. When a minimum of the tangent slopes in the optical effective diameter region of the image-side surface R2 of the optical lens element L2 is SPmin, the following condition is satisfied: |SPmin|=1.39.

When a super-wide field of wavelength factor of the optical lens element L3 as arranging the anti-reflective coating is Farw, the following condition is satisfied: Farw=0.334. When a first anti-reflective coating arranging factor of the object-side surface R1 of the optical lens element L3 is Far1, a second anti-reflective coating arranging factor of the object-side surface R1 of the optical lens element L3 is Far2, and a major anti-reflective coating arranging factor of the object-side surface R1 of the optical lens element L3 is FAR, the following conditions are satisfied: Far1=0.370; Far2=0.031; and FAR=−2.411. When a first anti-reflective coating arranging factor of the image-side surface R2 of the optical lens element L3 is Far1, a second anti-reflective coating arranging factor of the image-side surface R2 of the optical lens element L3 is Far2, and a major anti-reflective coating arranging factor of the image-side surface R2 of the optical lens element L3 is FAR, the following conditions are satisfied: Far1=0.327; Far2=0.018; and FAR=−2.695.

When a central thickness of the optical lens element L3 is CT, the following condition is satisfied: CT=0.26. The coating layer at the innermost of the anti-reflective coating is a first coating layer, and a refractive index of the first coating layer is N1. When a refractive index of the optical lens element L3 is Ns, the following condition is satisfied: Ns=1.64.

When a maximum of displacements in parallel with an optical axis from an axial vertex of the optical lens element L3 to the object-side surface R1 of the optical lens element L3 is SAGmax, the following condition is satisfied: |SAGmax|=0.10. When an average of tangent slopes in an optical effective diameter region of the object-side surface R1 of the optical lens element L3 is SPavg, the following condition is satisfied: |SPavg|=9.09. When a minimum of the tangent slopes in the optical effective diameter region of the object-side surface R1 of the optical lens element L3 is SPmin, the following condition is satisfied: |SPmin|=3.50.

When a maximum of displacements in parallel with an optical axis from an axial vertex of the optical lens element L3 to the image-side surface R2 of the optical lens element L3 is SAGmax, the following condition is satisfied: |SAGmax|=0.09. When an average of tangent slopes in an optical effective diameter region of the image-side surface R2 of the optical lens element L3 is SPavg, the following condition is satisfied: |SPavg|=11.90. When a minimum of the tangent slopes in the optical effective diameter region of the image-side surface R2 of the optical lens element L3 is SPmin, the following condition is satisfied: |SPmin|=4.55.

When a super-wide field of wavelength factor of the optical lens element L4 as arranging the anti-reflective coating is Farw, the following condition is satisfied: Farw=0.078. When a first anti-reflective coating arranging factor of the object-side surface R1 of the optical lens element 4 is Far1, a second anti-reflective coating arranging factor of the object-side surface R1 of the optical lens element L4 is Far2, and a major anti-reflective coating arranging factor of the object-side surface R1 of the optical lens element 4 is FAR, the following conditions are satisfied: Far1=0.228; Far2=0.021; and FAR=−3.415. When a first anti-reflective coating arranging factor of the image-side surface R2 of the optical lens element 4 is Far1, a second anti-reflective coating arranging factor of the image-side surface R2 of the optical lens element 4 is Far2, and a major anti-reflective coating arranging factor of the image-side surface R2 of the optical lens element L4 is FAR, the following conditions are satisfied: Far1=0.765; Far2=0.159; and FAR=−2.020.

When a central thickness of the optical lens element 4 is CT, the following condition is satisfied: CT=0.64. The coating layer at the innermost of the anti-reflective coating is a first coating layer, and a refractive index of the first coating layer is N1. When a refractive index of the optical lens element 4 is Ns, the following condition is satisfied: Ns=1.54.

When a maximum of displacements in parallel with an optical axis from an axial vertex of the optical lens element 4 to the object-side surface R1 of the optical lens element 4 is SAGmax, the following condition is satisfied: |SAGmax|=0.15. When an average of tangent slopes in an optical effective diameter region of the object-side surface R1 of the optical lens element 4 is SPavg, the following condition is satisfied: |SPavg|=9.26. When a minimum of the tangent slopes in the optical effective diameter region of the object-side surface R1 of the optical lens element 4 is SPmin, the following condition is satisfied: |SPmin|=5.03.

When a maximum of displacements in parallel with an optical axis from an axial vertex of the optical lens element 4 to the image-side surface R2 of the optical lens element 4 is SAGmax, the following condition is satisfied: |SAGmax|=0.49. When an average of tangent slopes in an optical effective diameter region of the image-side surface R2 of the optical lens element 4 is SPavg, the following condition is satisfied: |SPavg|=3.17. When a minimum of the tangent slopes in the optical effective diameter region of the image-side surface R2 of the optical lens element 4 is SPmin, the following condition is satisfied: |SPmin|=1.98.

When a super-wide field of wavelength factor of the optical lens element L5 as arranging the anti-reflective coating is Farw, the following condition is satisfied: Farw=0.078. When a first anti-reflective coating arranging factor of the object-side surface R1 of the optical lens element L5 is Far1, a second anti-reflective coating arranging factor of the object-side surface R1 of the optical lens element L5 is Far2, and a major anti-reflective coating arranging factor of the object-side surface R1 of the optical lens element 5 is FAR, the following conditions are satisfied: Far1=1.911; Far2=0.172; and FAR=−1.588. When a first anti-reflective coating arranging factor of the image-side surface R2 of the optical lens element 5 is Far1, a second anti-reflective coating arranging factor of the image-side surface R2 of the optical lens element 5 is Far2, and a major anti-reflective coating arranging factor of the image-side surface R2 of the optical lens element L5 is FAR, the following conditions are satisfied: Far1=1.272; Far2=0.262; and FAR=−1.582.

When a central thickness of the optical lens element 5 is CT, the following condition is satisfied: CT=0.32. The coating layer at the innermost of the anti-reflective coating is a first coating layer, and a refractive index of the first coating layer is N1. When a refractive index of the optical lens element 5 is Ns, the following condition is satisfied: Ns=1.54.

When a maximum of displacements in parallel with an optical axis from an axial vertex of the optical lens element 5 to the object-side surface R1 of the optical lens element 5 is SAGmax, the following condition is satisfied: |SAGmax|=0.62. When an average of tangent slopes in an optical effective diameter region of the object-side surface R1 of the optical lens element 5 is SPavg, the following condition is satisfied: |SPavg|=3.32. When a minimum of the tangent slopes in the optical effective diameter region of the object-side surface R1 of the optical lens element 5 is SPmin, the following condition is satisfied: |SPmin|=1.75.

When a maximum of displacements in parallel with an optical axis from an axial vertex of the optical lens element 5 to the image-side surface R2 of the optical lens element 5 is SAGmax, the following condition is satisfied: |SAGmax|=0.41. When an average of tangent slopes in an optical effective diameter region of the image-side surface R2 of the optical lens element 5 is SPavg, the following condition is satisfied: |SPavg|=3.45. When a minimum of the tangent slopes in the optical effective diameter region of the image-side surface R2 of the optical lens element 5 is SPmin, the following condition is satisfied: |SPmin|=1.11.

Figure 2:
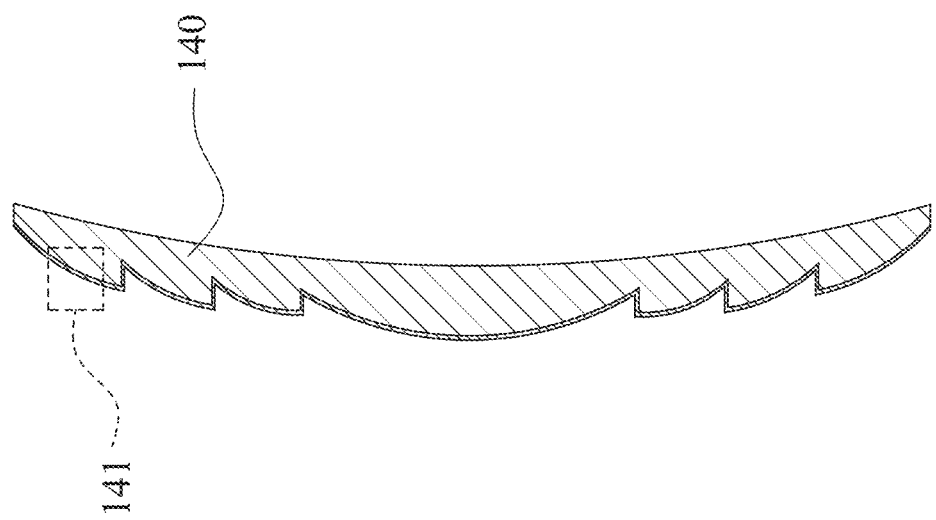
FIG. 2 is a schematic view of a Fresnel lens element of the imaging apparatus of FIG. 1.
Figure 3:
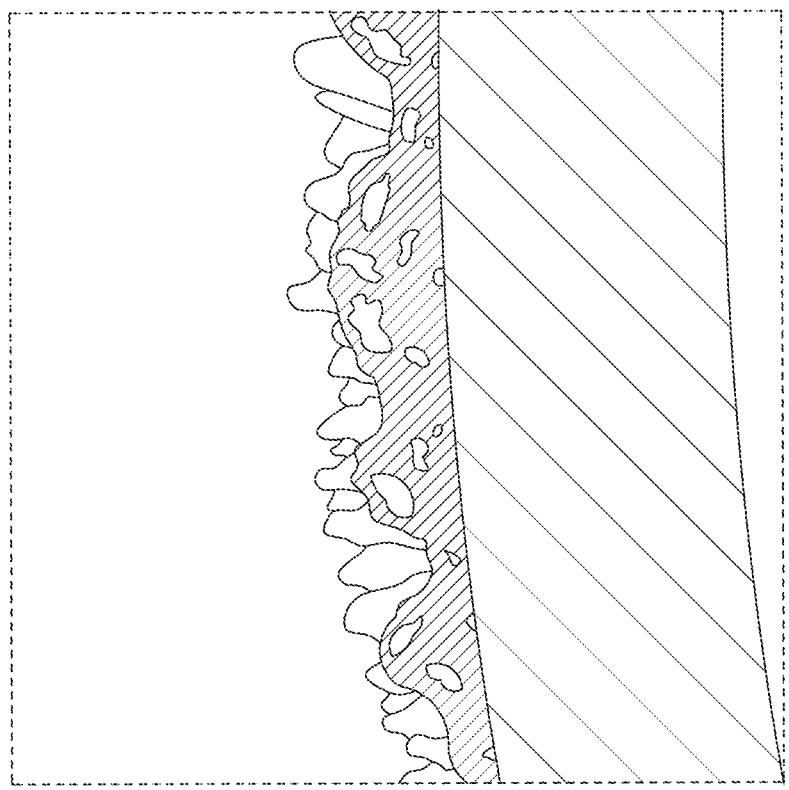
FIG. 3 is a partial enlarged schematic view of an anti-reflective coating of the imaging apparatus of FIG. 1.
Figure 4:
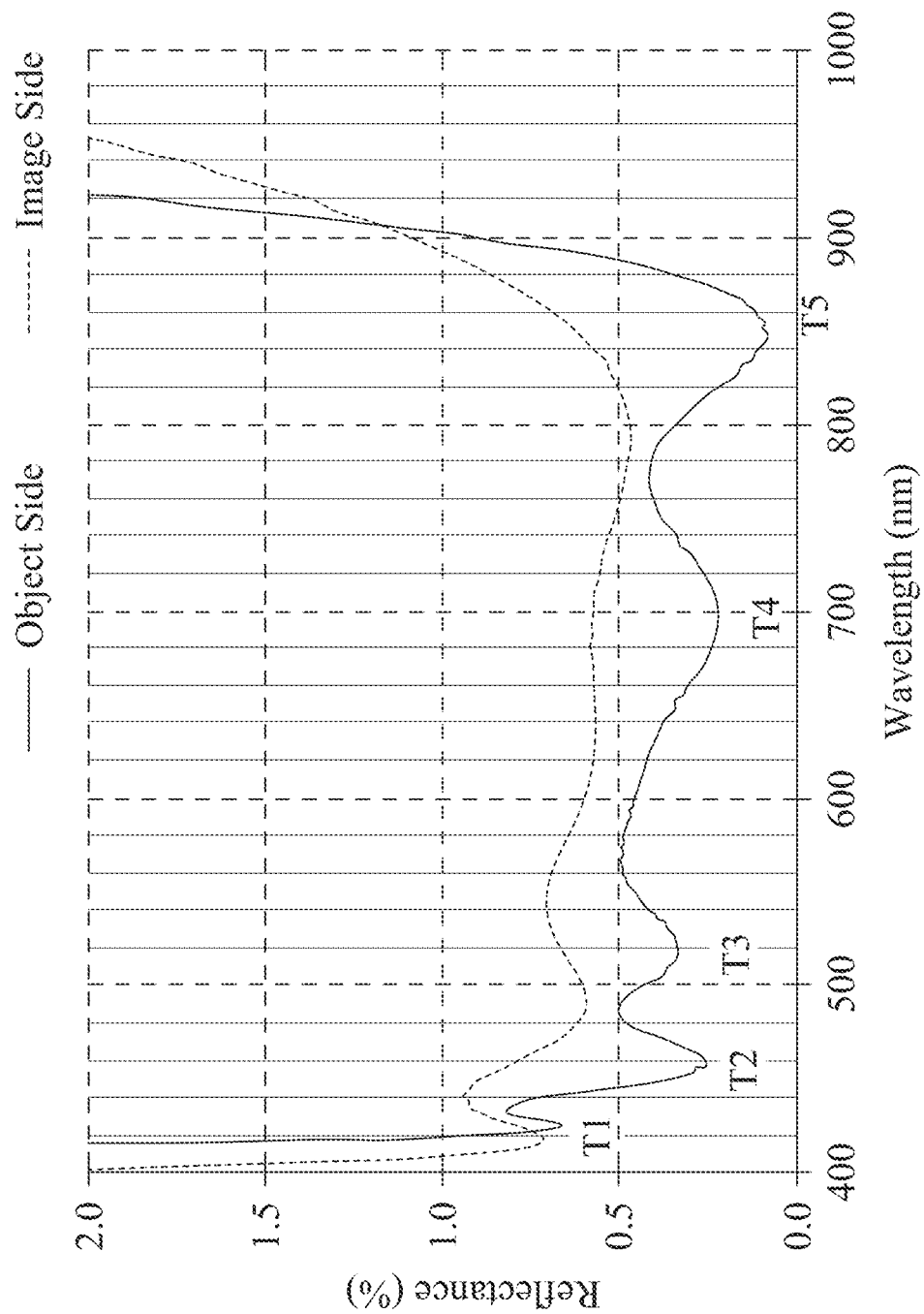
FIG. 4 is a relationship diagram of reflectance and wavelength of an optical lens assembly according to the comparison.
Figure 5:
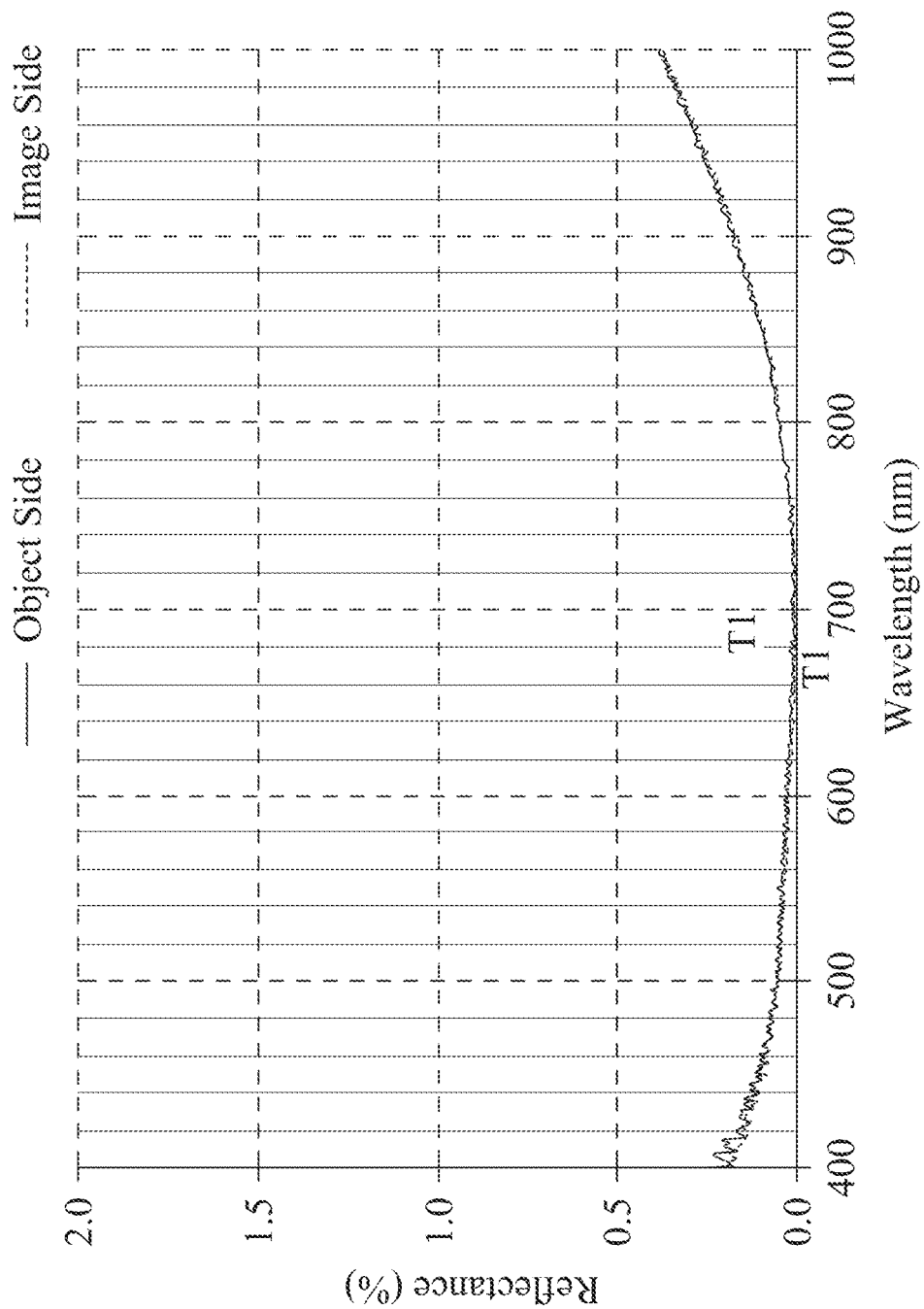
FIG. 5 is a relationship diagram of reflectance and wavelength of an optical lens assembly according to the 3rd embodiment.
Figure 6:
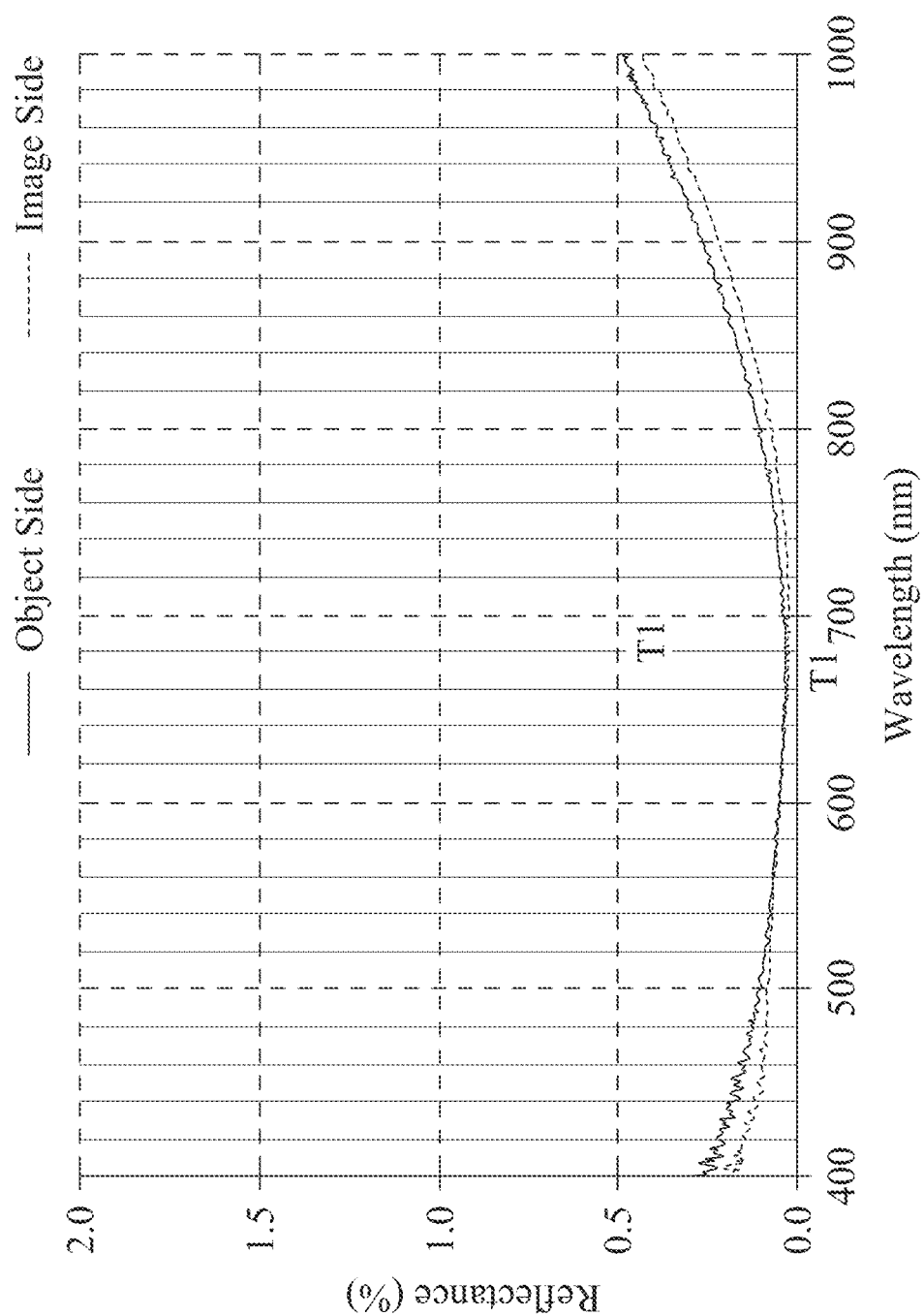
FIG. 6 is a relationship diagram of reflectance and wavelength of an optical lens assembly according to the 4th embodiment.
Figure 7:
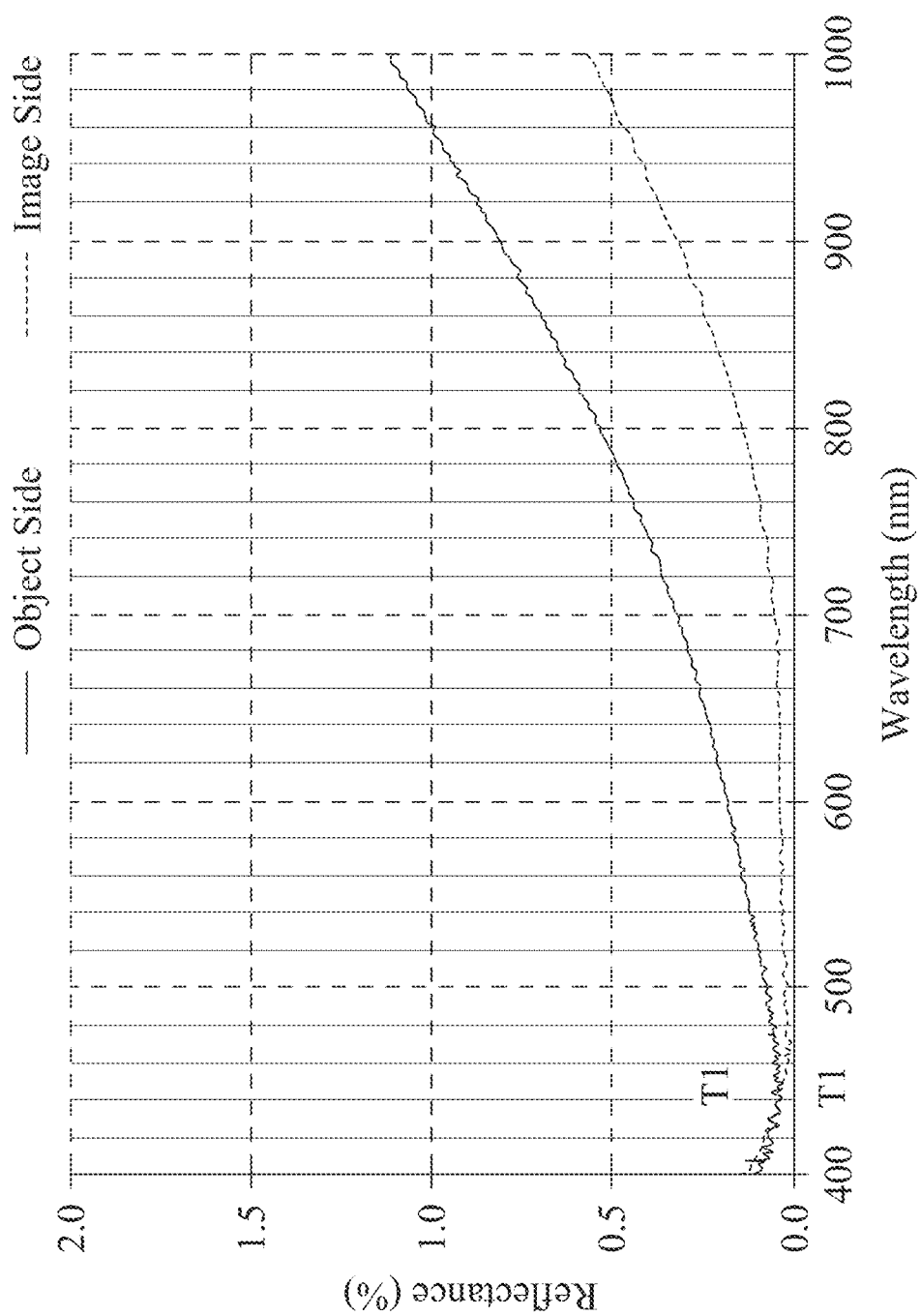
FIG. 7 is a relationship diagram of reflectance and wavelength of an optical lens assembly according to the 7th embodiment.
Figure 8:
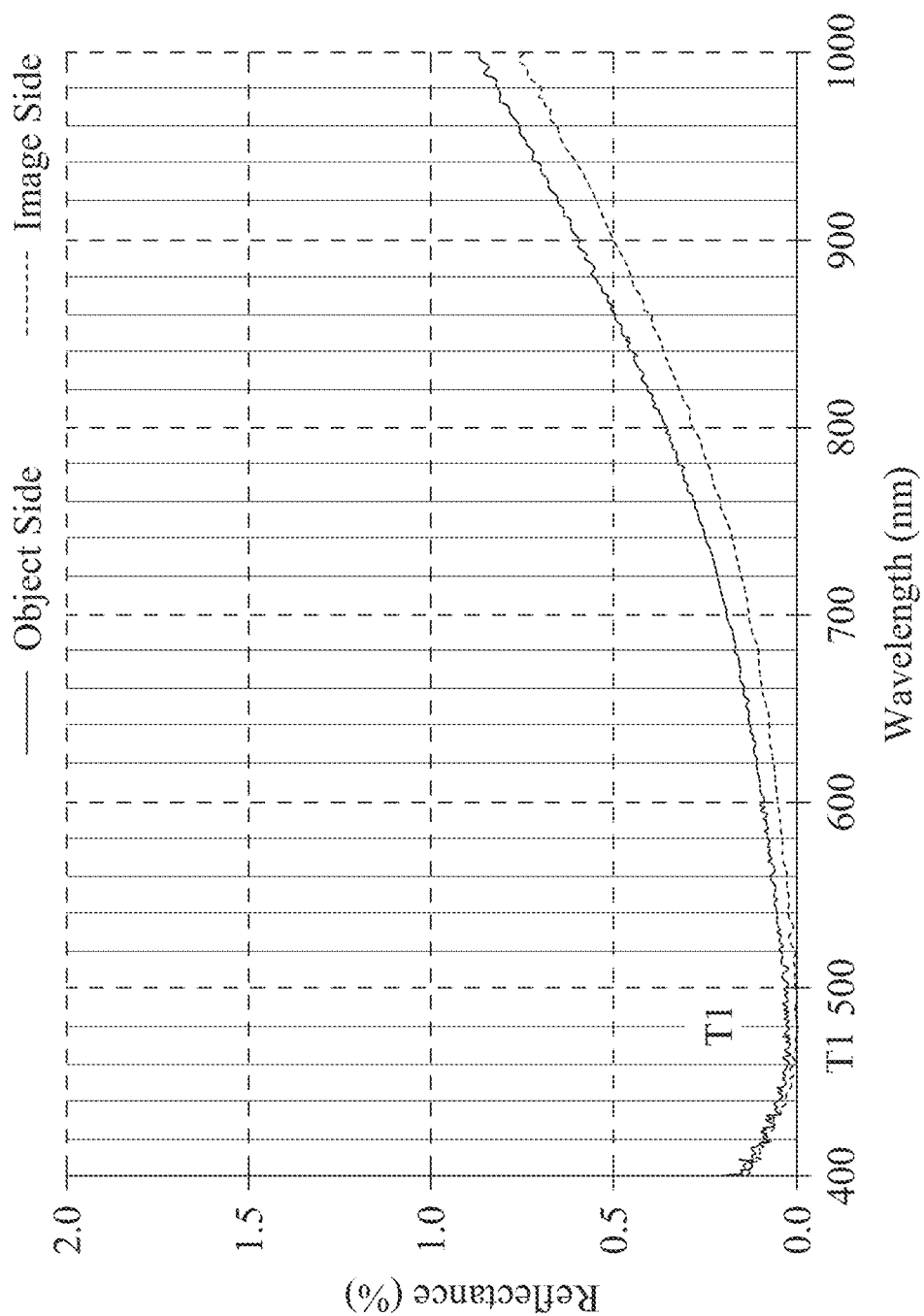
FIG. 8 is a relationship diagram of reflectance and wavelength of an optical lens assembly according to the 8th embodiment.
Figure 9:
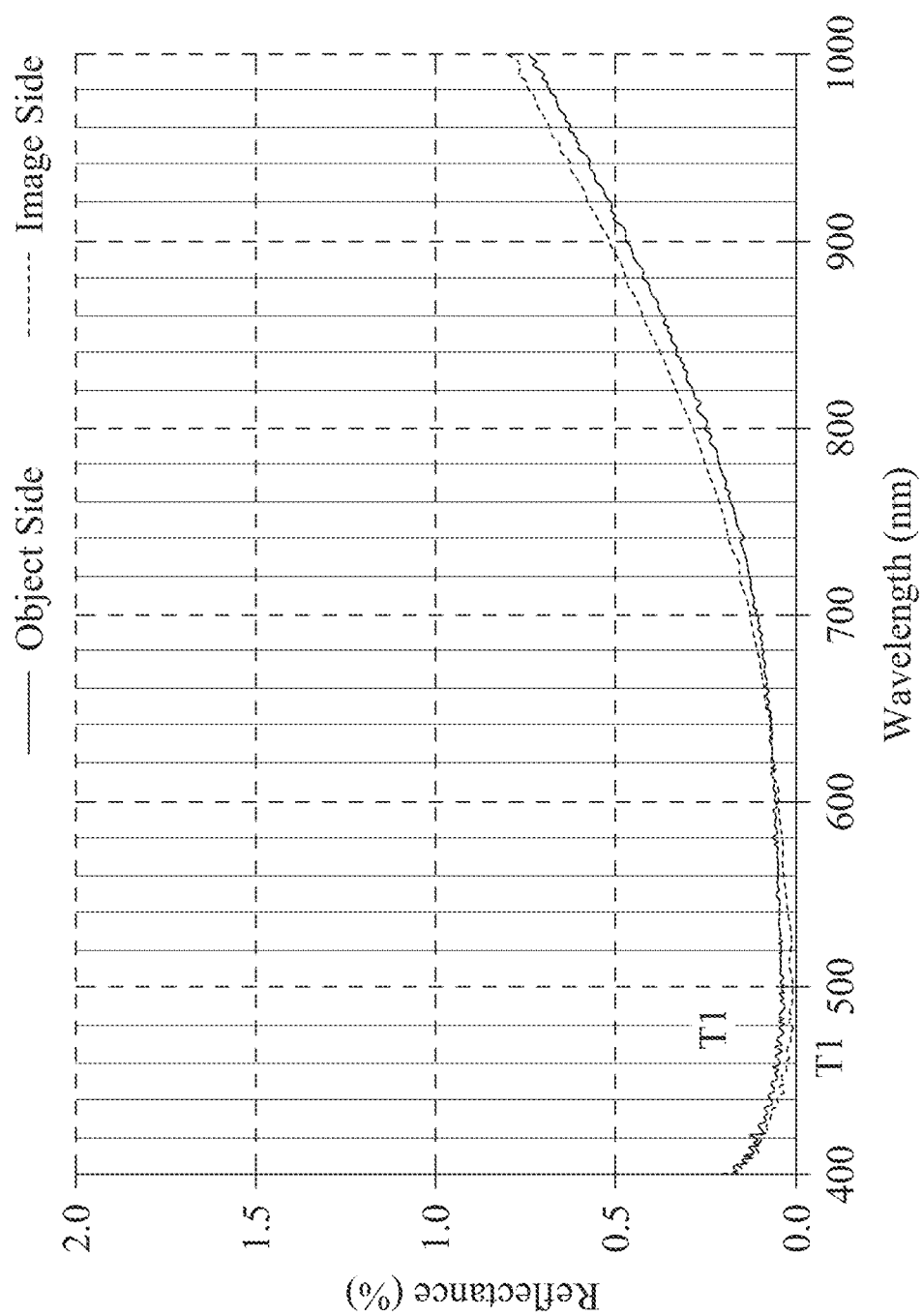
FIG. 9 is a relationship diagram of reflectance and wavelength of an optical lens assembly according to the 9th embodiment.

Please also refer to FIG. 2 and FIG. 3. FIG. 2 is a schematic view of a Fresnel lens element 140 of the imaging apparatus of FIG. 1. FIG. 3 is a partial enlarged schematic view of an anti-reflective coating of the imaging apparatus of FIG. 1. The imaging apparatus of the 1st embodiment can further include a barrel element 110, a light-blocking element 120, a spacing element 130 and the Fresnel lens element 140. The anti-reflective coatings can be arranged on an outer surface 111 of the barrel element 110, an inner surface 112 of the barrel element 110, a surface 121 of the light-blocking element 120, a surface 131 of the spacing element 130, a surface 141 of the Fresnel lens element 140, the optical effective diameter regions A1 of the object-side surfaces of the optical lens elements in the optical lens assembly, the optical effective diameter regions A2 of the image-side surfaces of the optical lens elements in the optical lens assembly and non-optical effective diameter regions A3 of the optical lens elements in the optical lens assembly. The anti-reflective coatings have the structure shown in FIG. 3.

The parameter values of each of the optical lens elements in the optical lens assembly according to the 1st embodiment are shown in Table 1 below.

TABLE 1

Coating Evaluation of Each Optical Lens Element of the 1st Embodiment

| | | FOV (degrees) 74.74 | | | | |
|---|---|---|---|---|---|---|
| | | L1 | L2 | L3 | L4 | L5 |
| CT (mm) | | 0.63 | 0.25 | 0.26 | 0.64 | 0.32 |
| Ns (587.6 nm) | | 1.54 | 1.64 | 1.64 | 1.54 | 1.54 |
| Farw = $((N1 - Ns)/(N1 + Ns))^2$ | | 0.071 | 0.334 | 0.334 | 0.078 | 0.078 |
| R1 | \|SAGmax\| (mm) | 0.34 | 0.01 | 0.10 | 0.15 | 0.62 |
| | Far1 = \|SAGmax\|/CT | 0.535 | 0.058 | 0.370 | 0.228 | 1.911 |

TABLE 1-continued

Coating Evaluation of Each Optical Lens Element of the 1st Embodiment

|  |  | FOV (degrees) 74.74 | | | | |
| --- | --- | --- | --- | --- | --- | --- |
|  |  | L1 | L2 | L3 | L4 | L5 |
|  | \|SPmin\| | 1.27 | 8.33 | 3.50 | 5.03 | 1.75 |
|  | \|SPavg\| | 2.67 | 43.48 | 9.09 | 9.26 | 3.32 |
|  | Far2 = 1/(\|SPavg\| × \|SPmin\|) | 0.295 | 0.003 | 0.031 | 0.021 | 0.172 |
|  | FAR = LOG(Far1 × Far2 × Farw) | −1.950 | −4.271 | −2.411 | −3.415 | −1.588 |
| R2 | \|SAGmax\| (mm) | 0.01 | 0.18 | 0.09 | 0.49 | 0.41 |
|  | Far1 = \|SAGmax\|/CT | 0.010 | 0.730 | 0.327 | 0.765 | 1.272 |
|  | \|SPmin\| | 2.79 | 1.39 | 4.55 | 1.98 | 1.11 |
|  | \|SPavg\| | 29.41 | 4.61 | 11.90 | 3.17 | 3.45 |
|  | Far2 = 1/(\|SPavg\| × \|SPmin\|) | 0.012 | 0.156 | 0.018 | 0.159 | 0.262 |
|  | FAR = LOG(Far1 × Far2 × Farw) | −5.050 | −1.421 | −2.695 | −2.020 | −1.582 |

2nd Embodiment

The imaging apparatus of the 2nd embodiment includes an optical lens assembly and an image sensor. The optical lens assembly includes, from an object side to an image side, six optical lens elements and an image surface. The image sensor is disposed on the image surface of the optical lens assembly. When a field of view of the optical lens assembly of the 2nd embodiment is FOV, the following condition is satisfied: FOV=85.45 degrees.

The aforementioned six optical lens elements are, from the object side to the image side, an optical lens element 1, an optical lens element 2, an optical lens element 3, an optical lens element L4, an optical lens element 5 and an optical lens element L6. At least one of the six optical lens elements includes an anti-reflective coating. The optical lens element including the anti-reflective coating is made of a plastic material. The anti-reflective coating is arranged on an object-side surface or an image-side surface of the optical lens element including the anti-reflective coating. The anti-reflective coating includes at least one coating layer, the coating layer at the outer of the anti-reflective coating is made of metal oxide. The anti-reflective coating includes a plurality of holes, and sizes of the plurality of holes adjacent to the outer of the anti-reflective coating are relatively larger than sizes of the plurality of holes adjacent to the inner of the anti-reflective coating. Each of the six optical lens elements includes an object-side surface R1 and an image-side surface R2.

The parameter values of each of the optical lens elements in the optical lens assembly according to the 2nd embodiment are shown in Table 2 below. The definitions of these parameters shown in the following table are the same as those stated in the 1st embodiment with corresponding values for the 2nd embodiment, so an explanation in this regard will not be provided again.

TABLE 2

Coating Evaluation of Each Optical Lens Element of the 2nd Embodiment

|  |  | FOV (degrees) 85.45 | | | | | |
| --- | --- | --- | --- | --- | --- | --- | --- |
|  |  | L1 | L2 | L3 | L4 | L5 | L6 |
| CT (mm) |  | 0.82 | 0.28 | 0.55 | 0.35 | 0.77 | 0.59 |
| Ns (587.6 nm) |  | 1.54 | 1.69 | 1.54 | 1.59 | 1.54 | 1.53 |
| Farw = ((N1 − Ns)/(N1 + Ns))² |  | 0.071 | 0.516 | 0.078 | 0.174 | 0.078 | 0.061 |
| R1 | \|SAGmax\| (mm) | 0.58 | 0.06 | 0.11 | 0.35 | 0.45 | 1.06 |
|  | Far1 = \|SAGmax\|/CT | 0.711 | 0.208 | 0.202 | 0.995 | 0.590 | 1.811 |
|  | \|SPmin\| | 1.21 | 4.65 | 2.34 | 1.33 | 1.81 | 1.42 |
|  | \|SPavg\| | 2.53 | 19.23 | 11.24 | 4.67 | 5.85 | 3.25 |
|  | Far2 = 1/(\|SPavg\| × \|SPmin\|) | 0.326 | 0.011 | 0.038 | 0.161 | 0.094 | 0.216 |
|  | FAR = LOG(Far1 × Far2 × Farw) | −1.783 | −2.921 | −3.220 | −1.555 | −2.360 | −1.623 |
| R2 | \|SAGmax\| (mm) | 0.07 | 0.17 | 0.24 | 0.31 | 0.90 | 0.88 |
|  | Far1 = \|SAGmax\|/CT | 0.090 | 0.596 | 0.439 | 0.900 | 1.172 | 1.503 |
|  | \|SPmin\| | 11.90 | 1.67 | 1.86 | 1.08 | 2.21 | 1.21 |
|  | \|SPavg\| | 18.52 | 6.17 | 6.58 | 5.85 | 3.48 | 3.36 |
|  | Far2 = 1/(\|SPavg\| × \|SPmin\|) | 0.005 | 0.097 | 0.082 | 0.158 | 0.130 | 0.247 |
|  | FAR = LOG(Far1 × Far2 × Farw) | −4.537 | −1.524 | −2.551 | −1.605 | −1.923 | −1.646 |

3rd Embodiment

The imaging apparatus of the 3rd embodiment includes an optical lens assembly and an image sensor. The optical lens assembly includes, from an object side to an image side, seven optical lens elements and an image surface. The image sensor is disposed on the image surface of the optical lens assembly. When a field of view of the optical lens assembly of the 3rd embodiment is FOV, the following condition is satisfied: FOV=78.95 degrees.

The aforementioned seven optical lens elements are, from the object side to the image side, an optical lens element L1, an optical lens element 2, an optical lens element 3, an optical lens element L4, an optical lens element L5, an optical lens element L6 and an optical lens element L7. At least one of the seven optical lens elements includes an anti-reflective coating. The optical lens element including the anti-reflective coating is made of a plastic material. The anti-reflective coating is arranged on an object-side surface or an image-side surface of the optical lens element including the anti-reflective coating. The anti-reflective coating includes at least one coating layer, the coating layer at the outer of the anti-reflective coating is made of metal oxide. The anti-reflective coating includes a plurality of holes, and sizes of the plurality of holes adjacent to the outer of the anti-reflective coating are relatively larger than sizes of the plurality of holes adjacent to the inner of the anti-reflective coating. Each of the seven optical lens elements includes an object-side surface R1 and an image-side surface R2.

The parameter values of each of the optical lens elements in the optical lens assembly according to the 3rd embodiment are shown in Table 3 below. The definitions of these parameters shown in the following table are the same as those stated in the 1st embodiment with corresponding values for the 3rd embodiment, so an explanation in this regard will not be provided again.

4th Embodiment

The imaging apparatus of the 4th embodiment includes an optical lens assembly and an image sensor. The optical lens assembly includes, from an object side to an image side, seven optical lens elements and an image surface. The image sensor is disposed on the image surface of the optical lens assembly. When a field of view of the optical lens assembly of the 4th embodiment is FOV, the following condition is satisfied: FOV=84.98 degrees.

The aforementioned seven optical lens elements are, from the object side to the image side, an optical lens element 1, an optical lens element 2, an optical lens element 3, an optical lens element L4, an optical lens element L5, an optical lens element L6 and an optical lens element L7. At least one of the seven optical lens elements includes an anti-reflective coating. The optical lens element including the anti-reflective coating is made of a plastic material. The anti-reflective coating is arranged on an object-side surface or an image-side surface of the optical lens element including the anti-reflective coating. The anti-reflective coating includes at least one coating layer, the coating layer at the outer of the anti-reflective coating is made of metal oxide. The anti-reflective coating includes a plurality of holes, and sizes of the plurality of holes adjacent to the outer of the anti-reflective coating are relatively larger than sizes of the plurality of holes adjacent to the inner of the anti-reflective coating. Each of the seven optical lens elements includes an object-side surface R1 and an image-side surface R2.

The parameter values of each of the optical lens elements in the optical lens assembly according to the 4th embodiment are shown in Table 4 below. The definitions of these parameters shown in the following table are the same as those stated in the 1st embodiment with corresponding values for the 4th embodiment, so an explanation in this regard will not be provided again.

TABLE 3

Coating Evaluation of Each Optical Lens Element of the 3rd Embodiment

| | | FOV (degrees) 78.95 | | | | | | |
|---|---|---|---|---|---|---|---|---|
| | | L1 | L2 | L3 | L4 | L5 | L6 | L7 |
| CT (mm) | | 0.90 | 0.36 | 0.58 | 0.41 | 1.16 | 0.51 | 0.54 |
| Ns (587.6 nm) | | 1.54 | 1.66 | 1.54 | 1.66 | 1.54 | 1.54 | 1.54 |
| Farw = $((N1 - Ns)/(N1 + Ns))^2$ | | 0.071 | 0.411 | 0.078 | 0.411 | 0.078 | 0.078 | 0.078 |
| R1 | |SAGmax| (mm) | 0.50 | 0.17 | 0.14 | 0.14 | 0.13 | 0.51 | 0.83 |
| | Far1 = |SAGmax|/CT | 0.556 | 0.475 | 0.244 | 0.345 | 0.115 | 1.005 | 1.528 |
| | |SPmin| | 2.08 | 3.91 | 1.78 | 2.92 | 9.17 | 0.79 | 1.79 |
| | |SPavg| | 3.77 | 10.31 | 11.36 | 9.17 | 15.87 | 2.59 | 3.70 |
| | Far2 = 1/(|SPavg| × |SPmin|) | 0.127 | 0.025 | 0.049 | 0.037 | 0.007 | 0.488 | 0.151 |
| | FAR = LOG(Far1 × Far2 × Farw) | −2.298 | −2.314 | −3.029 | −2.276 | −4.212 | −1.420 | −1.746 |
| R2 | |SAGmax| (mm) | 0.05 | 0.27 | 0.37 | 0.08 | 0.70 | 0.42 | 0.60 |
| | Far1 = |SAGmax|/CT | 0.058 | 0.755 | 0.635 | 0.187 | 0.607 | 0.814 | 1.107 |
| | |SPmin| | 5.21 | 2.19 | 1.04 | 4.35 | 1.78 | 0.81 | 1.47 |
| | |SPavg| | 35.71 | 5.92 | 4.65 | 15.38 | 3.50 | 2.67 | 3.41 |
| | Far2 = 1/(|SPavg| × |SPmin|) | 0.005 | 0.077 | 0.206 | 0.015 | 0.161 | 0.463 | 0.199 |
| | FAR = LOG(Far1 × Far2 × Farw) | −4.652 | −1.621 | −1.993 | −2.939 | −2.120 | −1.534 | −1.767 |

TABLE 4

Coating Evaluation of Each Optical Lens Element of the 4th Embodiment

|  |  | FOV (degrees) 84.98 | | | | | | |
|---|---|---|---|---|---|---|---|---|
|  |  | L1 | L2 | L3 | L4 | L5 | L6 | L7 |
| CT (mm) |  | 0.83 | 0.25 | 0.28 | 0.60 | 0.38 | 0.54 | 0.50 |
| Ns (587.6 nm) |  | 1.54 | 1.69 | 1.67 | 1.54 | 1.57 | 1.54 | 1.53 |
| Farw = $((N1 - Ns)/(N1 + Ns))^2$ |  | 0.071 | 0.516 | 0.446 | 0.078 | 0.123 | 0.078 | 0.062 |
| R1 | \|SAGmax\| (mm) | 0.64 | 0.17 | 0.10 | 0.05 | 0.59 | 0.51 | 1.10 |
|  | Far1 = \|SAGmax\|/CT | 0.777 | 0.698 | 0.370 | 0.091 | 1.544 | 0.949 | 2.205 |
|  | \|SPmin\| | 1.15 | 2.16 | 2.49 | 3.52 | 0.75 | 1.20 | 1.43 |
|  | \|SPavg\| | 2.43 | 7.75 | 11.11 | 18.87 | 3.41 | 3.34 | 3.45 |
|  | Far2 = 1/(\|SPavg\| × \|SPmin\|) | 0.357 | 0.060 | 0.036 | 0.015 | 0.390 | 0.250 | 0.203 |
|  | FAR = LOG(Far1 × Far2 × Farw) | −1.705 | −1.668 | −2.224 | −3.968 | −1.131 | −1.731 | −1.560 |
| R2 | \|SAGmax\| (mm) | 0.09 | 0.25 | 0.08 | 0.35 | 0.45 | 0.70 | 1.14 |
|  | Far1 = \|SAGmax\|/CT | 0.113 | 1.007 | 0.274 | 0.587 | 1.190 | 1.309 | 2.280 |
|  | \|SPmin\| | 9.35 | 1.44 | 4.50 | 1.82 | 2.08 | 1.45 | 1.33 |
|  | \|SPavg\| | 16.13 | 4.72 | 14.08 | 5.13 | 5.65 | 3.38 | 3.05 |
|  | Far2 = 1/(\|SPavg\| × \|SPmin\|) | 0.007 | 0.147 | 0.016 | 0.107 | 0.085 | 0.205 | 0.246 |
|  | FAR = LOG(Far1 × Far2 × Farw) | −4.275 | −1.116 | −2.715 | −2.309 | −1.906 | −1.678 | −1.462 |

5th Embodiment

The imaging apparatus of the 5th embodiment includes an optical lens assembly and an image sensor. The optical lens assembly includes, from an object side to an image side, eight optical lens elements and an image surface. The image sensor is disposed on the image surface of the optical lens assembly. When a field of view of the optical lens assembly of the 5th embodiment is FOV, the following condition is satisfied: FOV=85.11 degrees.

The aforementioned eight optical lens elements are, from the object side to the image side, an optical lens element 1, an optical lens element 2, an optical lens element 3, an optical lens element L4, an optical lens element L5, an optical lens element L6, an optical lens element L7 and an optical lens element L8. At least one of the eight optical lens elements includes an anti-reflective coating. The optical lens element including the anti-reflective coating is made of a plastic material. The anti-reflective coating is arranged on an object-side surface or an image-side surface of the optical lens element including the anti-reflective coating. The anti-reflective coating includes at least one coating layer, the coating layer at the outer of the anti-reflective coating is made of metal oxide. The anti-reflective coating includes a plurality of holes, and sizes of the plurality of holes adjacent to the outer of the anti-reflective coating are relatively larger than sizes of the plurality of holes adjacent to the inner of the anti-reflective coating. Each of the eight optical lens elements includes an object-side surface R1 and an image-side surface R2.

The parameter values of each of the optical lens elements in the optical lens assembly according to the 5th embodiment are shown in Table 5 below. The definitions of these parameters shown in the following table are the same as those stated in the 1st embodiment with corresponding values for the 5th embodiment, so an explanation in this regard will not be provided again.

TABLE 5

Coating Evaluation of Each Optical Lens Element of the 5th Embodiment

|  |  | FOV (degrees) 85.11 | | | | | | | |
|---|---|---|---|---|---|---|---|---|---|
|  |  | L1 | L2 | L3 | L4 | L5 | L6 | L7 | L8 |
| CT (mm) |  | 1.15 | 0.33 | 0.34 | 0.61 | 0.39 | 0.43 | 0.69 | 0.86 |
| Ns (587.6 nm) |  | 1.54 | 1.69 | 1.69 | 1.54 | 1.67 | 1.59 | 1.57 | 1.53 |
| Farw = $((N1 - Ns)/(N1 + Ns))^2$ |  | 0.071 | 0.516 | 0.516 | 0.078 | 0.446 | 0.174 | 0.123 | 0.062 |
| R1 | \|SAGmax\| (mm) | 0.97 | 0.24 | 0.09 | 0.14 | 0.36 | 0.85 | 1.32 | 1.87 |
|  | Far1 = \|SAGmax\|/CT | 0.840 | 0.741 | 0.271 | 0.230 | 0.906 | 2.002 | 1.910 | 2.164 |
|  | \|SPmin\| | 1.01 | 2.06 | 6.02 | 4.29 | 2.34 | 0.65 | 0.92 | 1.50 |
|  | \|SPavg\| | 2.24 | 8.20 | 19.23 | 12.82 | 6.17 | 2.92 | 2.60 | 3.10 |
|  | Far2 = 1/(\|SPavg\| × \|SPmin\|) | 0.445 | 0.059 | 0.009 | 0.018 | 0.069 | 0.530 | 0.417 | 0.216 |
|  | FAR = LOG(Far1 × Far2 × Farw) | −1.576 | −1.644 | −2.918 | −3.485 | −1.552 | −0.733 | −1.010 | −1.542 |

TABLE 5-continued

Coating Evaluation of Each Optical Lens Element of the 5th Embodiment

|  |  | FOV (degrees) 85.11 | | | | | | | |
|---|---|---|---|---|---|---|---|---|---|
|  |  | L1 | L2 | L3 | L4 | L5 | L6 | L7 | L8 |
| R2 | \|SAGmax\| (mm) | 0.20 | 0.34 | 0.09 | 0.40 | 0.33 | 0.87 | 1.47 | 2.03 |
|  | Far1 = \|SAGmax\|/CT | 0.172 | 1.037 | 0.277 | 0.655 | 0.843 | 2.034 | 2.124 | 2.351 |
|  | \|SPmin\| | 5.29 | 1.54 | 3.77 | 1.29 | 2.61 | 1.32 | 1.32 | 1.17 |
|  | \|SPavg\| | 10.31 | 5.26 | 17.86 | 5.15 | 7.30 | 3.60 | 2.82 | 3.00 |
|  | Far2 = 1/(\|SPavg\| × \|SPmin\|) | 0.018 | 0.124 | 0.015 | 0.150 | 0.052 | 0.210 | 0.267 | 0.284 |
|  | FAR = LOG(Far1 × Far2 × Farw) | −3.650 | −1.179 | −2.672 | −2.113 | −1.705 | −1.128 | −1.157 | −1.387 |

6th Embodiment

The imaging apparatus of the 6th embodiment includes an optical lens assembly and an image sensor. The optical lens assembly includes, from an object side to an image side, nine optical lens elements and an image surface. The image sensor is disposed on the image surface of the optical lens assembly. When a field of view of the optical lens assembly of the 6th embodiment is FOV, the following condition is satisfied: FOV=86.76 degrees.

The aforementioned nine optical lens elements are, from the object side to the image side, an optical lens element 1, an optical lens element 2, an optical lens element 3, an optical lens element L4, an optical lens element L5, an optical lens element L6, an optical lens element L7, an optical lens element L8 and an optical lens element L9. At least one of the nine optical lens elements includes an anti-reflective coating. The optical lens element including the anti-reflective coating is made of a plastic material. The anti-reflective coating is arranged on an object-side surface or an image-side surface of the optical lens element including the anti-reflective coating. The anti-reflective coating includes at least one coating layer, the coating layer at the outermost of the anti-reflective coating is made of metal oxide. The anti-reflective coating includes a plurality of holes, and sizes of the plurality of holes adjacent to the outermost of the anti-reflective coating are relatively larger than sizes of the plurality of holes adjacent to the innermost of the anti-reflective coating. Each of the nine optical lens elements includes an object-side surface R1 and an image-side surface R2.

The parameter values of each of the optical lens elements in the optical lens assembly according to the 6th embodiment are shown in Table 6 below. The definitions of these parameters shown in the following table are the same as those stated in the 1st embodiment with corresponding values for the 6th embodiment, so an explanation in this regard will not be provided again.

TABLE 6

Coating Evaluation of Each Optical Lens Element of the 6th Embodiment

|  |  | FOV (degrees) 86.76 | | | | | | | | |
|---|---|---|---|---|---|---|---|---|---|---|
|  |  | L1 | L2 | L3 | L4 | L5 | L6 | L7 | L8 | L9 |
| CT (mm) | | 1.14 | 0.31 | 0.32 | 0.50 | 0.36 | 0.43 | 0.52 | 0.64 | 0.71 |
| Ns (587.6 nm) | | 1.54 | 1.69 | 1.69 | 1.54 | 1.66 | 1.64 | 1.59 | 1.54 | 1.53 |
| Farw = ((N1 − Ns)/(N1 + Ns))$^2$ | | 0.071 | 0.516 | 0.516 | 0.078 | 0.411 | 0.332 | 0.174 | 0.078 | 0.062 |
| R1 | \|SAGmax\| (mm) | 0.96 | 0.24 | 0.11 | 0.12 | 0.28 | 0.94 | 1.56 | 1.02 | 1.51 |
|  | Far1 = \|SAGmax\|/CT | 0.837 | 0.780 | 0.336 | 0.247 | 0.788 | 2.170 | 2.992 | 1.594 | 2.120 |
|  | \|SPmin\| | 1.06 | 1.72 | 5.52 | 5.29 | 2.98 | 0.43 | 0.88 | 2.00 | 2.19 |
|  | \|SPavg\| | 2.26 | 7.69 | 15.38 | 13.70 | 7.04 | 2.53 | 2.29 | 4.50 | 3.97 |
|  | Far2 = 1/(\|SPavg\| × \|SPmin\|) | 0.417 | 0.076 | 0.012 | 0.014 | 0.048 | 0.914 | 0.498 | 0.111 | 0.115 |
|  | FAR = LOG(Far1 × Far2 × Farw) | −1.605 | −1.516 | −2.690 | −3.574 | −1.812 | −0.181 | −0.586 | −1.858 | −1.823 |
| R2 | \|SAGmax\| (mm) | 0.18 | 0.33 | 0.13 | 0.35 | 0.32 | 0.91 | 1.75 | 1.23 | 1.63 |
|  | Far1 = \|SAGmax\|/CT | 0.160 | 1.075 | 0.415 | 0.702 | 0.897 | 2.088 | 3.350 | 1.924 | 2.291 |
|  | \|SPmin\| | 6.02 | 1.32 | 2.17 | 1.09 | 2.82 | 1.23 | 0.71 | 1.72 | 1.72 |
|  | \|SPavg\| | 11.36 | 5.00 | 10.75 | 5.88 | 7.04 | 3.34 | 2.20 | 4.18 | 3.75 |
|  | Far2 = 1/(\|SPavg\| × \|SPmin\|) | 0.015 | 0.152 | 0.043 | 0.156 | 0.050 | 0.242 | 0.638 | 0.139 | 0.156 |
|  | FAR = LOG(Far1 × Far2 × Farw) | −3.778 | −1.074 | −2.036 | −2.066 | −1.732 | −0.774 | −0.429 | −1.679 | −1.658 |

<Reflectance Measurement Results at Different Wavelengths>

First, the arrangements of the anti-reflective coatings of the comparison and the 1st embodiment to the 9th embodiment are shown in Table 7 below.

TABLE 7

Arrangements of Anti-Reflective Coatings of Comparison and 1st Embodiment to 9th Embodiment

| Comparison | | | | 1st Embodiment to 9th Embodiment | | | |
|---|---|---|---|---|---|---|---|
| Order of Coating Layers | Material | Refractive Index | Physical Thickness (nm) | Order of Coating Layers | Material | Refractive Index | Physical Thickness (nm) |
| Substrate | Plastic | 1.55 | — | Substrate | Plastic | 1.53-1.69 | — |
| 1 | TiO$_2$ (PVD) | 2.34867 (NH) | 14 | 1 | SiO$_2$ (PVD) | 1.46 (N1) | 100 |
| 2 | SiO$_2$ (PVD) | 1.4618 (NL) | 33 | 2 | Al$_2$O$_3$ (CVD) | 1.21 (N2) | 115 |
| 3 | TiO$_2$ (PVD) | 2.34867 (NH) | 56 | | | | |
| 4 | SiO$_2$ (PVD) | 1.4618 (NL) | 9 | | | | |
| 5 | TiO$_2$ (PVD) | 2.34867 (NH) | 42 | | | | |
| 6 | SiO$_2$ (PVD) | 1.4618 (NL) | 92 | | | | |
| Total Thickness (tTK) | | 246 | | Total Thickness (tTK) | | 215 | |

In Table 7, the anti-reflective coating of the comparison includes six coating layers, and a total thickness of coating layers thereof is 246 nm. In comparison, each of the anti-reflective coatings of the 1st embodiment to the 9th embodiment only includes two coating layers, and a total thickness of coating layers thereof is only 215 nm. It shows that the arrangement of the anti-reflective coating according to the present disclosure can effectively improve the manufacturing efficiency and save the cost.

The comparison, 3rd embodiment, 4th embodiment, 7th embodiment, 8th embodiment and 9th embodiment are measured to obtain the wavelengths at trough, reflectance at trough and reflectance at different wavelengths thereof. The measurement results are shown in Table 8 to Table 10 below.

TABLE 8

Measurement Results of Reflectance of Comparison and 3rd Embodiment

| Embodiment | | Comparison | | 3 | |
|---|---|---|---|---|---|
| Total Number of Optical Lens Elements | | 7 | | 7 | |
| Optical Lens Element Including Anti-Reflective Coating Surface | | L6 | | L6 | |
| | | Object Side | Image Side | Object Side | Image Side |
| Wavelength (nm) | Wtmin | 849 | 790 | 699 | 700 |
| Reflectance (%) | Rtmin | 0.0852 | 0.4688 | 0.0056 | 0.0038 |
| | R4070 | 1.1210 | 0.6895 | 0.0587 | 0.0522 |
| | R4060 | 1.5122 | 0.7461 | 0.0796 | 0.0716 |
| | R40100 | 1.4206 | 0.8732 | 0.0967 | 0.0926 |
| | R5060 | 0.4296 | 0.6612 | 0.0418 | 0.0357 |
| | R6070 | 0.3358 | 0.5759 | 0.0169 | 0.0133 |
| | R6080 | 0.3391 | 0.5461 | 0.0190 | 0.0172 |
| | R70100 | 1.7161 | 1.0560 | 0.1344 | 0.1326 |
| | R80100 | 2.4002 | 1.3241 | 0.1909 | 0.1884 |
| | R90100 | 4.5184 | 1.9704 | 0.2769 | 0.2711 |
| | R40 | 30.7348 | 2.3259 | 0.2484 | 0.1996 |
| | R50 | 0.4305 | 0.6055 | 0.0565 | 0.0520 |
| | R60 | 0.4546 | 0.5988 | 0.0272 | 0.0229 |

TABLE 8-continued

Measurement Results of Reflectance of Comparison and 3rd Embodiment

| | | | | |
|---|---|---|---|---|
| R70 | 0.2203 | 0.5748 | 0.0073 | 0.0038 |
| R80 | 0.3420 | 0.4737 | 0.0464 | 0.0464 |
| R90 | 0.8884 | 1.0840 | 0.1774 | 0.1745 |
| R100 | 9.7150 | 3.0532 | 0.3827 | 0.3632 |

TABLE 9

Measurement Results of Reflectance of 4th Embodiment and 7th Embodiment

| Embodiment | | 4 | | 7 | |
|---|---|---|---|---|---|
| Total Number of Optical Lens Elements | | 7 | | 7 | |
| Optical Lens Element Including Anti-Reflective Coating Surface | | L7 | | L6 | |
| | | Object Side | Image Side | Object Side | Image Side |
| Wavelength (nm) | Wtmin | 662 | 697 | 449 | 470 |
| Reflectance (%) | Rtmin | 0.0270 | 0.0210 | 0.0333 | 0.0105 |
| | R4070 | 0.0906 | 0.0700 | 0.1459 | 0.0405 |
| | R4060 | 0.1186 | 0.0889 | 0.0945 | 0.0392 |
| | R40100 | 0.1469 | 0.1178 | 0.4169 | 0.1473 |
| | R5060 | 0.0707 | 0.0648 | 0.1286 | 0.0324 |
| | R6070 | 0.0346 | 0.0323 | 0.2487 | 0.0431 |
| | R6080 | 0.0478 | 0.0358 | 0.3362 | 0.0667 |
| | R70100 | 0.2028 | 0.1654 | 0.6875 | 0.2538 |
| | R80100 | 0.2736 | 0.2283 | 0.8193 | 0.3355 |
| | R90100 | 0.3704 | 0.3196 | 0.9666 | 0.4440 |
| | R40 | 0.2930 | 0.1990 | 0.1222 | 0.1450 |
| | R50 | 0.1020 | 0.0810 | 0.0741 | 0.0225 |
| | R60 | 0.0440 | 0.0500 | 0.1809 | 0.0415 |
| | R70 | 0.0340 | 0.0230 | 0.3236 | 0.0542 |
| | R80 | 0.1040 | 0.0730 | 0.5341 | 0.1417 |
| | R90 | 0.2600 | 0.2180 | 0.8108 | 0.3220 |
| | R100 | 0.4830 | 0.4270 | 1.1117 | 0.5595 |

TABLE 10

Measurement Results of Reflectance of 8th Embodiment and 9th Embodiment

| Embodiment | | 8 | | 9 | |
|---|---|---|---|---|---|
| Total Number of Optical Lens Elements | | 7 | | 6 | |
| Optical Lens Element Including Anti-Reflective Coating | | L6 | | L6 | |
| Surface | | Object Side | Image Side | Object Side | Image Side |
| Wavelength (nm) | Wtmin | 465 | 479 | 491 | 494 |
| Reflectance (%) | Rtmin | 0.0161 | 0.0108 | 0.0331 | 0.0045 |
| | R4070 | 0.0833 | 0.0496 | 0.0652 | 0.0541 |
| | R4060 | 0.0572 | 0.0316 | 0.0599 | 0.0399 |
| | R40100 | 0.2880 | 0.2264 | 0.2191 | 0.2364 |
| | R5060 | 0.0591 | 0.0240 | 0.0467 | 0.0260 |
| | R6070 | 0.1354 | 0.0855 | 0.0758 | 0.0823 |
| | R6080 | 0.2016 | 0.1414 | 0.1220 | 0.1409 |
| | R70100 | 0.4923 | 0.4029 | 0.3726 | 0.4183 |
| | R80100 | 0.6045 | 0.5057 | 0.4748 | 0.5277 |
| | R90100 | 0.7338 | 0.6270 | 0.5985 | 0.6557 |
| | R40 | 0.1939 | 0.1703 | 0.1905 | 0.2367 |
| | R50 | 0.0292 | 0.0023 | 0.0356 | 0.0101 |
| | R60 | 0.0934 | 0.0498 | 0.0574 | 0.0491 |
| | R70 | 0.1904 | 0.1295 | 0.1089 | 0.1267 |
| | R80 | 0.3597 | 0.2773 | 0.2484 | 0.2872 |
| | R90 | 0.5947 | 0.4958 | 0.4671 | 0.5223 |
| | R100 | 0.8660 | 0.7502 | 0.7392 | 0.7944 |

Please refer to FIG. 4 to FIG. 9. FIG. 4, FIG. 5, FIG. 6, FIG. 7, FIG. 8 and FIG. 9 are relationship diagrams of reflectance and wavelengths of optical lens assemblies according to the comparison, 3rd embodiment, 4th embodiment, 7th embodiment, 8th embodiment and 9th embodiment, respectively. From the abovementioned measurement results, the anti-reflective effect of the optical lens assembly of the comparison has ups and downs as the wavelength changing, and the anti-reflective effect thereof is poor at short wavelength region and long wavelength region. In comparison, uniform anti-reflective effect at different wavelengths is performed by the optical lens assemblies of the 3rd embodiment, the 4th embodiment, the 7th embodiment, the 8th embodiment and the 9th embodiment. It proves that the optical lens assembly of the present disclosure has the best anti-reflective effect in the wide field of wavelength, which is favorable for improving the imaging quality.

Figure 10A:
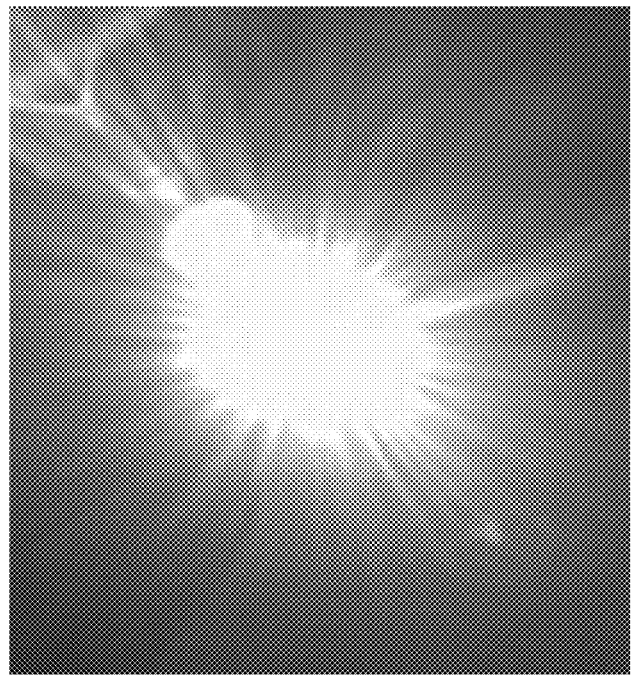
FIG. 10A is a testing figure of image quality from the optical lens assembly of the comparison under a strong incident light at 40 degrees.
Figure 10B:
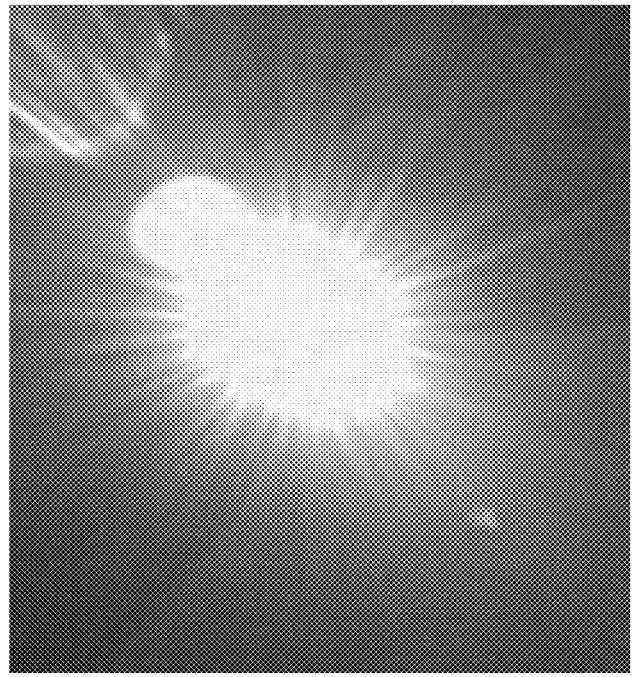
FIG. 10B is a testing figure of image quality from the optical lens assembly of the 4th embodiment under a strong incident light at 40 degrees.

Please refer to FIG. 10A and FIG. 10B. FIG. 10A and FIG. 10B are testing figures of image quality from the optical lens assemblies of the comparison and 4th embodiment under a strong incident light at 40 degrees, respectively. In FIG. 10A, unexpected lights show on the upper right corner in the image. In FIG. 10B, stray lights on the upper right corner in the image are significantly reduced, which means that the optical lens assembly of the present disclosure has excellent effect of eliminating stray lights in the image corners.

Figure 11:
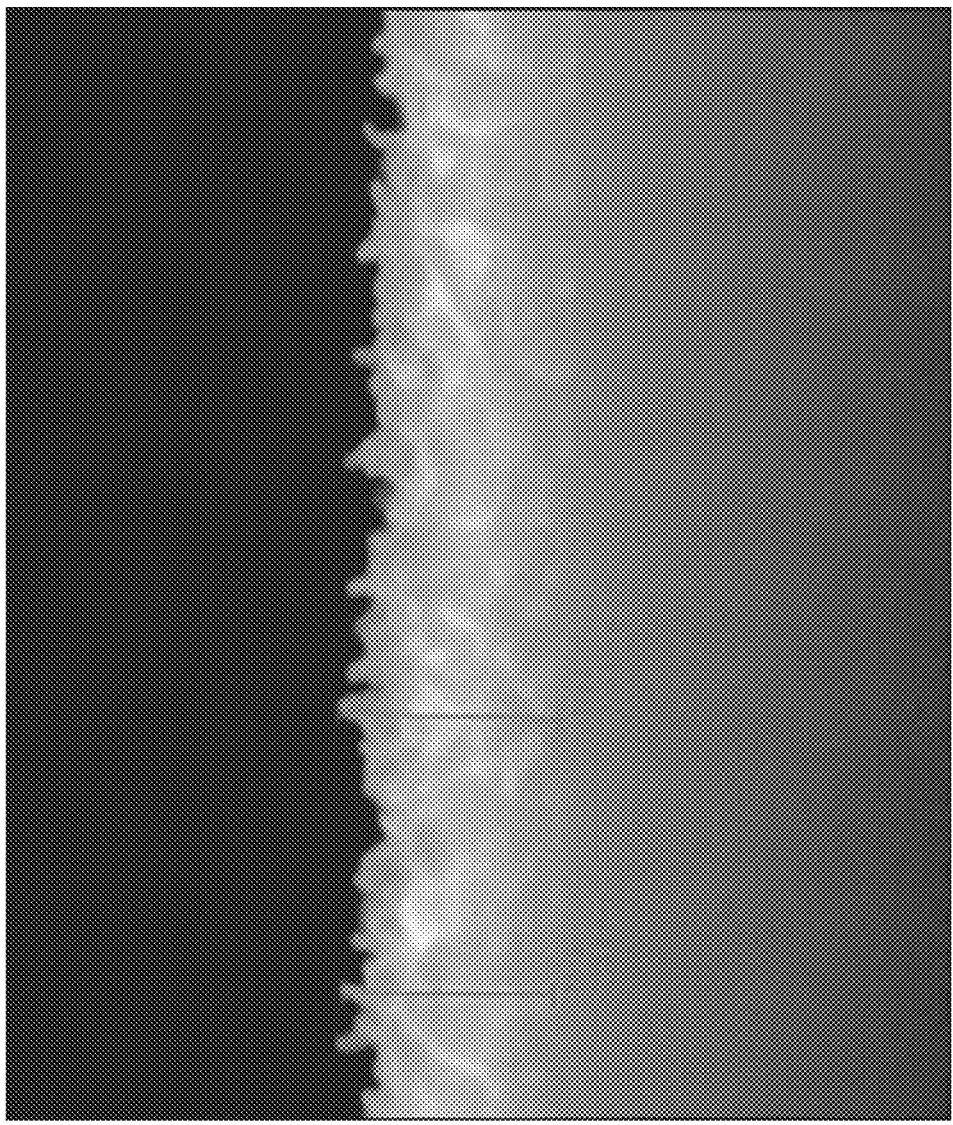
FIG. 11 is a sectional view of an optical lens element including an anti-reflective coating of the 4th embodiment.

Please refer to FIG. 11. FIG. 11 is a sectional view of the optical lens element including an anti-reflective coating of the 4th embodiment. In FIG. 11, it shows that the sizes of the plurality of holes adjacent to the outer of the anti-reflective coating are relatively larger than the sizes of the plurality of holes adjacent to the inner of the anti-reflective coating, which means that, in the same plane, the irregular nanofiber structure distributes with a lower density at the outer of the anti-reflective coating, and the irregular nanofiber structure distributes with a higher density at the inner of the anti-reflective coating.

The optical lens assembly with multiple optical lens elements is provided in the present disclosure. The multiple coating-layer design is adopted to obtain an excellent coating arranging formula in a wide field of wavelength with specific multiple anti-reflective coating factors. Furthermore, due to the characteristic of subwavelength structures on the surface of the anti-reflective coating, the best anti-reflective effect in the wide field of wavelength of the high-quality optical lens assembly with multiple optical lens elements can be obtained. The severe reflective problem, which is difficult to be solved, of strong light at large angle on the optical lens elements with extreme surface shape changes can also be overcome. It is especially suitable for the curved optical lens element and the material with relatively high refractive index, so as to obtain a uniform anti-reflective effect within all fields and the wide field of wavelength. In this regard, when the assembly is applied to the optical lens assembly with multiple optical lens elements, it is favorable for significantly enhancing the imaging quality of the high-end optical lens assembly.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly, comprising, from an object side to an image side:
    at least five optical lens elements;
    wherein at least one of the optical lens elements comprises an anti-reflective coating, the optical lens element comprising the anti-reflective coating is made of a plastic material, the anti-reflective coating is arranged on an object-side surface or an image-side surface of the optical lens element comprising the anti-reflective coating, the anti-reflective coating comprises at least one coating layer, the coating layer at an outer of the anti-reflective coating is made of metal oxide, the anti-reflective coating comprises a plurality of holes, and sizes of the plurality of holes adjacent to the outer of the anti-reflective coating are relatively larger than sizes of the plurality of holes adjacent to an inner of the anti-reflective coating;
    wherein a refractive index of the optical lens element comprising the anti-reflective coating is Ns, the coating layer at the innermost of the anti-reflective coating is a first coating layer, a refractive index of the first coating layer is N1, a thickness of the first coating layer is TL1, a super-wide field of wavelength factor of the optical lens assembly as arranging the anti-reflective coating is Farw, Farw=$((N1-Ns)/(N1+Ns))^2$, an average of tangent slopes in an optical effective diameter region of a surface of the optical lens element comprising the anti-reflective coating is SPavg, a minimum of the tangent slopes in the optical effective diameter region of the surface of the optical lens element comprising the anti-reflective coating is SPmin, a second anti-reflective coating arranging factor of the optical lens assembly is Far2, Far2=1/(|SPavg|×|SPmin|), and the following conditions are satisfied:

$N1<Ns;$ 50 nm≤$TL1$≤200 nm;

Farw≤0.60; and 0.100≤$Far2$.

2. The optical lens assembly of claim 1, wherein a central thickness of the optical lens element comprising the anti-reflective coating is CT, a maximum of displacements in parallel with an optical axis from an axial vertex of the optical lens element comprising the anti-reflective coating to the surface of the optical lens element comprising the anti-reflective coating is SAGmax, a first anti-reflective coating arranging factor of the optical lens assembly is Far1, Far1=|SAGmax|/CT, and the following condition is satisfied:

0.500≤$Far1$.

3. The optical lens assembly of claim 2, wherein the average of the tangent slopes in the optical effective diameter region of the surface of the optical lens element comprising the anti-reflective coating is SPavg, the minimum of the tangent slopes in the optical effective diameter region of the surface of the optical lens element comprising the anti-reflective coating is SPmin, the second anti-reflective coating arranging factor of the optical lens assembly is Far2, Far2=1/(|SPavg|×|SPmin|), and the following condition is satisfied:

0.400≤$Far2$≤0.9.

4. The optical lens assembly of claim 1, wherein a central thickness of the optical lens element comprising the anti-reflective coating is CT, a maximum of displacements in parallel with an optical axis from an axial vertex of the optical lens element comprising the anti-reflective coating to the surface of the optical lens element comprising the anti-reflective coating is SAGmax, a first anti-reflective coating arranging factor of the optical lens assembly is Far1, Far1=|SAGmax|/CT, the average of the tangent slopes in the optical effective diameter region of the surface of the optical lens element comprising the anti-reflective coating is SPavg, the minimum of the tangent slopes in the optical effective diameter region of the surface of the optical lens element comprising the anti-reflective coating is SPmin, the second anti-reflective coating arranging factor of the optical lens assembly is Far2, Far2=1/(|SPavg|×|SPmin|), the refractive index of the optical lens element comprising the anti-reflective coating is Ns, the refractive index of the first coating layer is N1, the super-wide field of wavelength factor of the optical lens assembly as arranging the anti-reflective coating is Farw, Farw=((N1−Ns)/(N1+Ns))², a major anti-reflective coating arranging factor of the optical lens assembly is FAR, FAR=LOG (Far1×Far2×Farw), and the following condition is satisfied:

−7.000≤$FAR$.

5. The optical lens assembly of claim 4, wherein the refractive index of the optical lens element comprising the anti-reflective coating is Ns, and the following condition is satisfied:

1.530≤$Ns$≤1.690.

6. The optical lens assembly of claim 5, wherein the refractive index of the first coating layer is N1, and the following condition is satisfied:

1.37≤$N1$≤1.63.

7. The optical lens assembly of claim 6, wherein a material of the first coating layer is $SiO_2$.

8. The optical lens assembly of claim 7, wherein the anti-reflective coating comprises at least two coating layers made of different main materials.

9. The optical lens assembly of claim 1, wherein a wavelength at a trough with lowest reflectance of the optical lens element comprising the anti-reflective coating is Wtmin, and the following condition is satisfied:

400 nm≤$Wtmin$≤750 nm.

10. The optical lens assembly of claim 9, wherein a reflectance at the trough with lowest reflectance of the optical lens element comprising the anti-reflective coating is Rtmin, and the following condition is satisfied:

0.01%≤$Rtmin$≤0.50%.

11. The optical lens assembly of claim 10, wherein an average reflectance between a wavelength of 400 nm-1000 nm of the optical lens element comprising the anti-reflective coating is R40100, and the following condition is satisfied:

0.05%≤$R40100$≤1.5%.

12. The optical lens assembly of claim 11, wherein a reflectance at a wavelength of 700 nm of the optical lens element comprising the anti-reflective coating is R70, and the following condition is satisfied:

0.01%≤$R70$≤1.0%.

13. The optical lens assembly of claim 12, wherein at least one surface of the optical lens element comprising the anti-reflective coating comprises at least one inflection point.

14. The optical lens assembly of claim 1, wherein a total number of coating layers of the anti-reflective coating is tLs, and the following condition is satisfied:

1≤$tLs$≤2.

15. The optical lens assembly of claim 14, wherein the anti-reflective coating comprises a second coating layer connected to the first coating layer, a thickness of the second coating layer is TL2, and the following condition is satisfied:

100 nm≤$TL2$≤250 nm.

16. The optical lens assembly of claim 15, wherein a total thickness of the first coating layer and the second coating layer of the anti-reflective coating is tTk, and the following condition is satisfied:

100 nm≤$tTk$≤300 nm.

17. An imaging apparatus, comprising:
the optical lens assembly of claim 1; and
an image sensor disposed on an image surface of the optical lens assembly.

18. An electronic device, which is a mobile device, and the electronic device comprising:
the imaging apparatus of claim 17.

19. An imaging apparatus, comprising:
the optical lens assembly of claim 1;
a Fresnel lens element, wherein at least one surface of the Fresnel lens element comprises an anti-reflective coating, and the anti-reflective coating of the Fresnel lens element is made of aluminum oxide; and an image sensor disposed on an image surface of the optical lens assembly.

* * * * *